INVENTORS
Arthur W. Lindholm
BY Gustaf W. Anderson
J. Stanley Churchill
ATTORNEY June 13, 1939.  A. W. LINDHOLM ET AL  2,162,263
PACKAGING MACHINE
Filed Dec. 31, 1935   17 Sheets-Sheet 8

INVENTORS
Arthur W. Lindholm
BY Gustaf W. Anderson
J. Stanley Churchill
ATTORNEY June 13, 1939.    A. W. LINDHOLM ET AL    2,162,263

PACKAGING MACHINE

Filed Dec. 31, 1935    17 Sheets-Sheet 9

Fig. 13
Fig. 14
Fig. 15
Fig. 16
Fig. 17
Fig. 18
Fig. 19
Fig. 20
Fig. 21
Fig. 22
Fig. 23
Fig. 24
Fig. 25

INVENTORS
Arthur W. Lindholm
BY Gustaf W. Anderson
J. Stanley Churchill
ATTORNEY

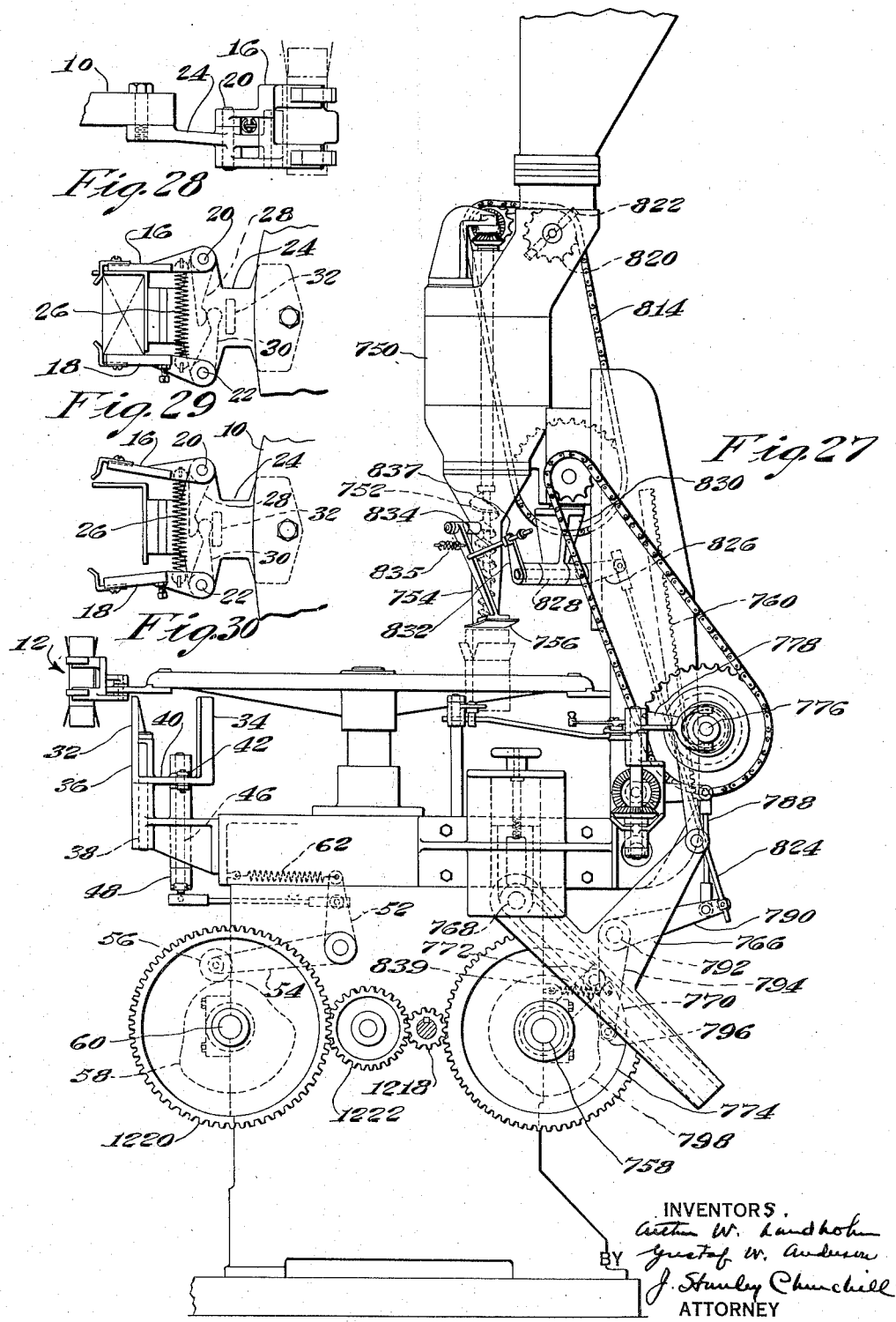

Fig. 31

June 13, 1939.   A. W. LINDHOLM ET AL   2,162,263
PACKAGING MACHINE
Filed Dec. 31, 1935   17 Sheets-Sheet 13
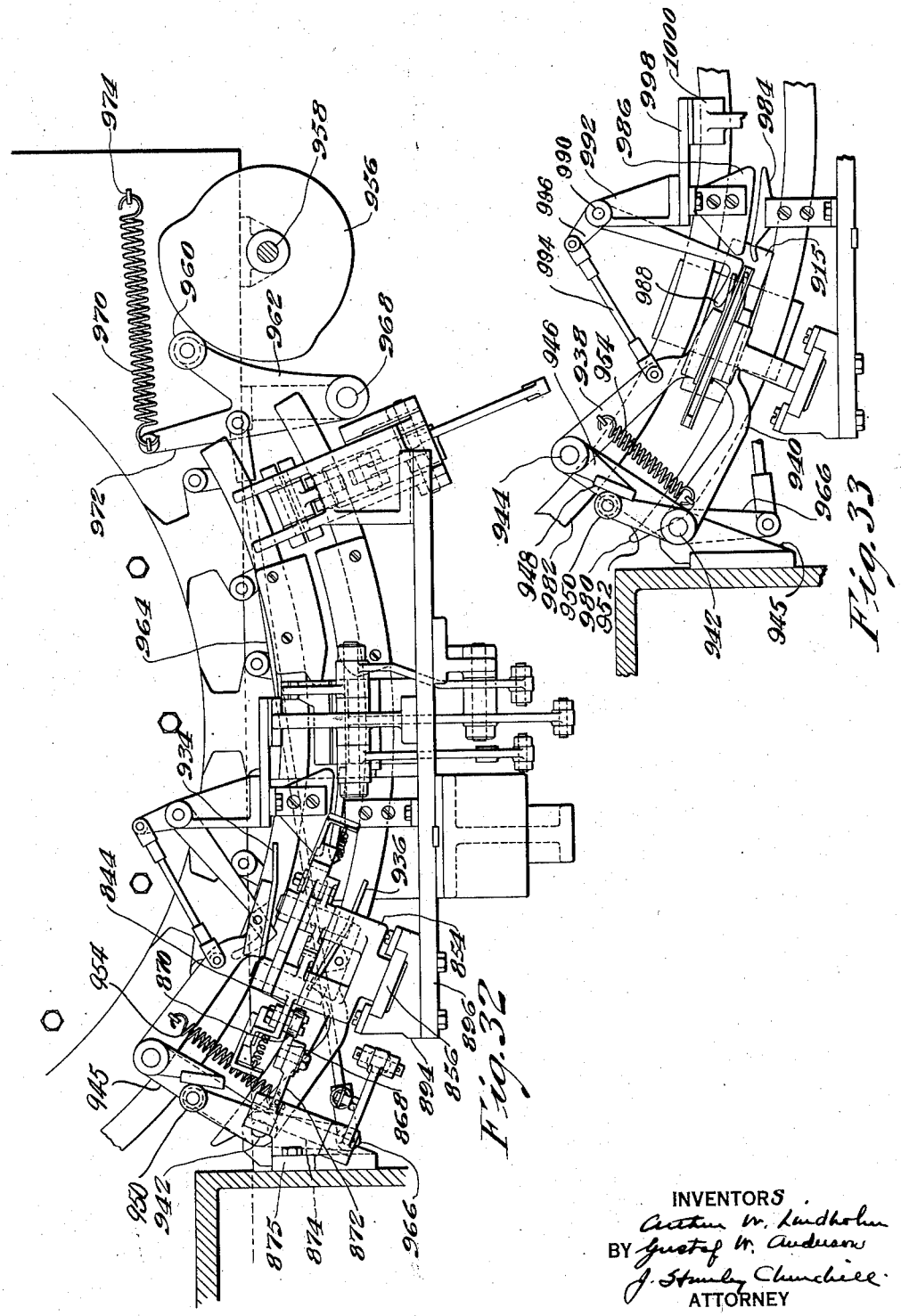
INVENTORS
Arthur W. Lindholm
BY Gustaf W. Anderson
J. Stanley Churchill
ATTORNEY

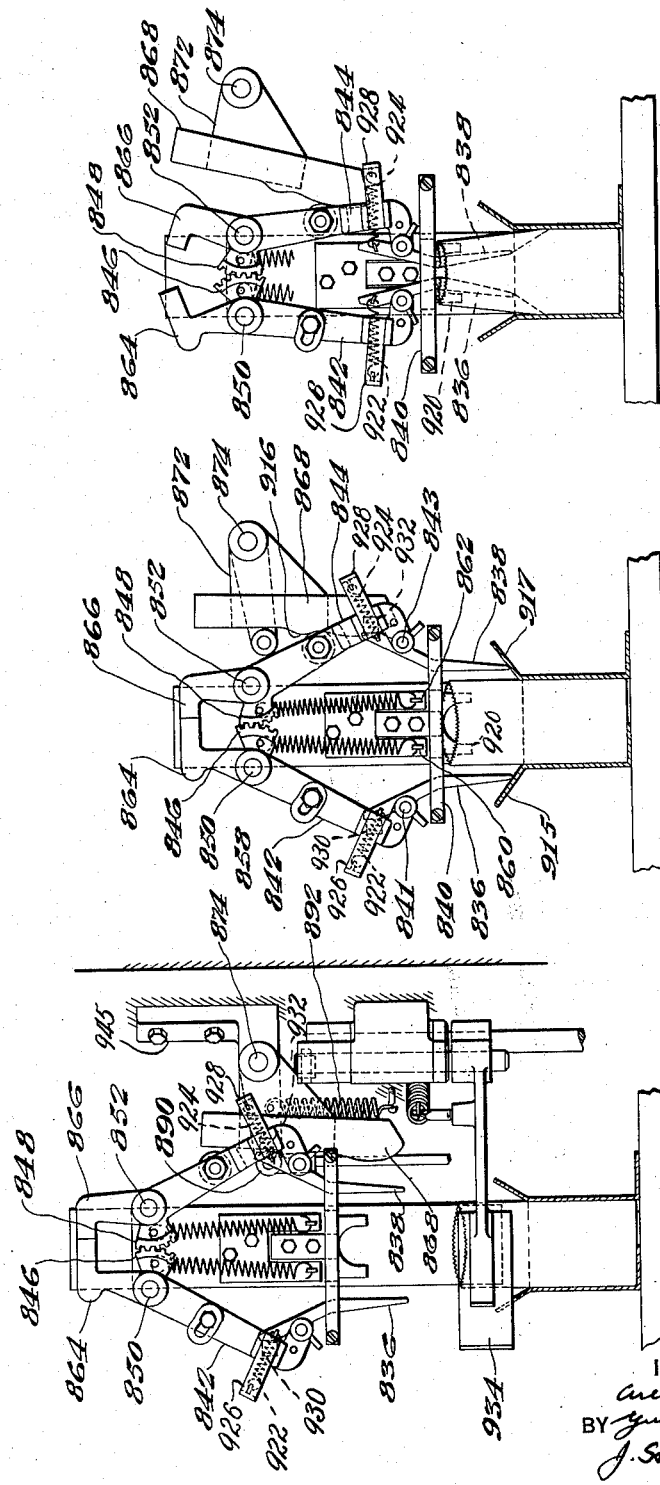

June 13, 1939.　　A. W. LINDHOLM ET AL　　2,162,263
PACKAGING MACHINE
Filed Dec. 31, 1935　　17 Sheets-Sheet 15

INVENTORS
Arthur W. Lindholm
BY Gustaf W. Andersson
J. Stanley Churchill
ATTORNEY

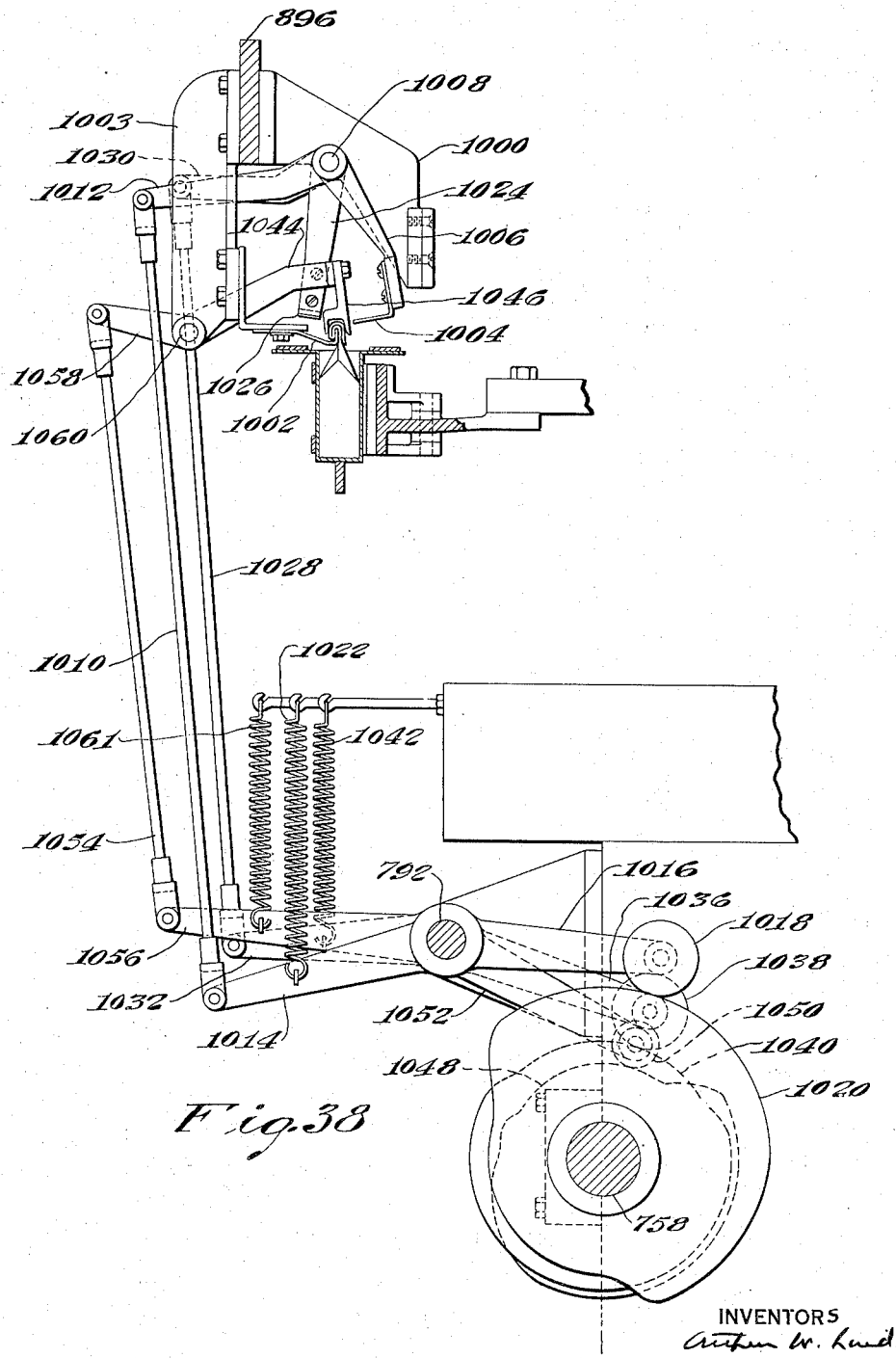

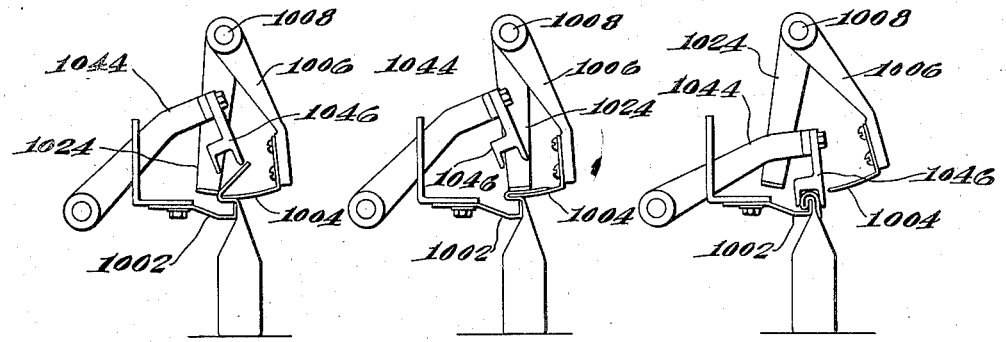
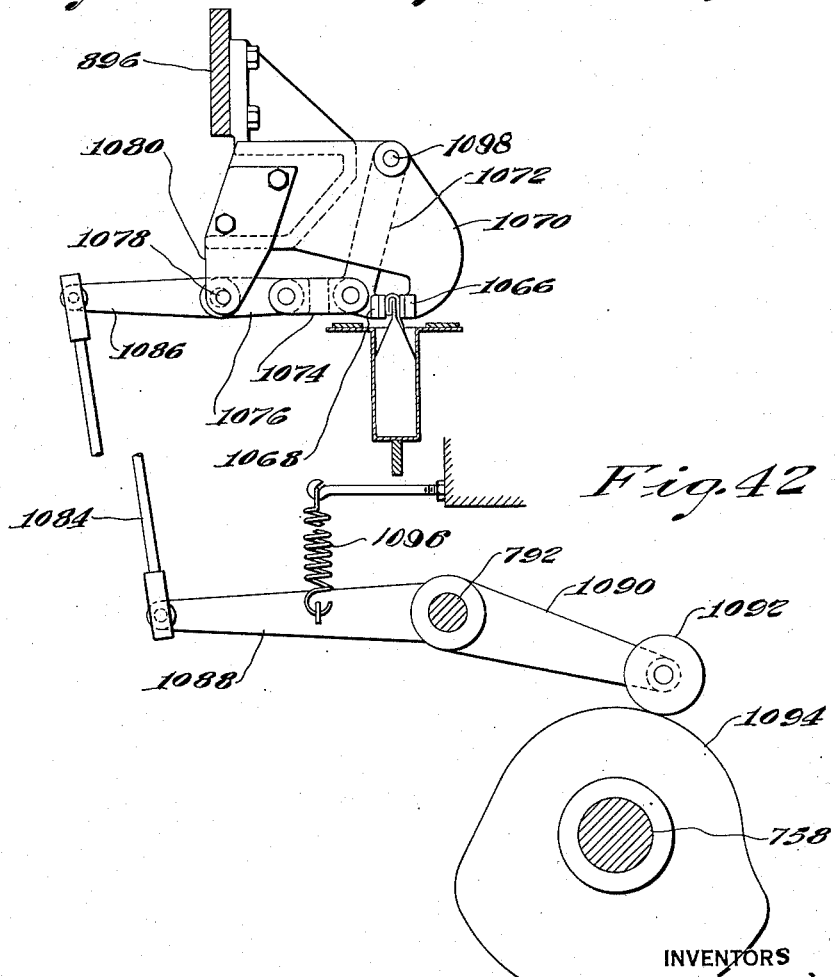

Patented June 13, 1939

2,162,263

UNITED STATES PATENT OFFICE 2,162,263

PACKAGING MACHINE

Arthur W. Lindholm, East Milton, and Gustaf Waldemar Anderson, North Quincy, Mass., assignors to Pneumatic Scale Corporation, Limited, Quincy, Mass., a corporation of Massachusetts Application December 31, 1935, Serial No. 56,958

20 Claims. (Cl. 93—36.01)

This invention relates to a packaging machine.

One object of the invention is to provide a novel and improved packaging machine in which provision is made for handling cartons and for inserting a liner therein, for filling the lined cartons, closing the mouth of the liner, and thereafter closing and sealing the carton to produce a novel and improved package in a novel, economical and practical manner.

A further object of the invention is to provide a novel and improved machine for producing lined cartons which is efficient in operation and by which the lined cartons may be produced in an economical manner.

Another object of the invention is to provide a novel and improved machine of the character specified in which provision is made for closing and sealing the flaps of a carton in a novel and highly efficient manner.

A still further object of the invention is to provide a novel and improved bag closing mechanism which is adapted to close the bag in a novel and improved manner, designed to provide an efficient and substantially air-tight closure for the contents of the bag.

With these general objects in view, and such others as may hereinafter appear, the invention consists in the packaging machine; in the lining machine; in the carton closing and sealing mechanism; in the bag closing mechanism; in the various structures, arrangements, and combinations of parts hereinafter described and particularly defined in the claims at the end of this specification.

Figure 1:
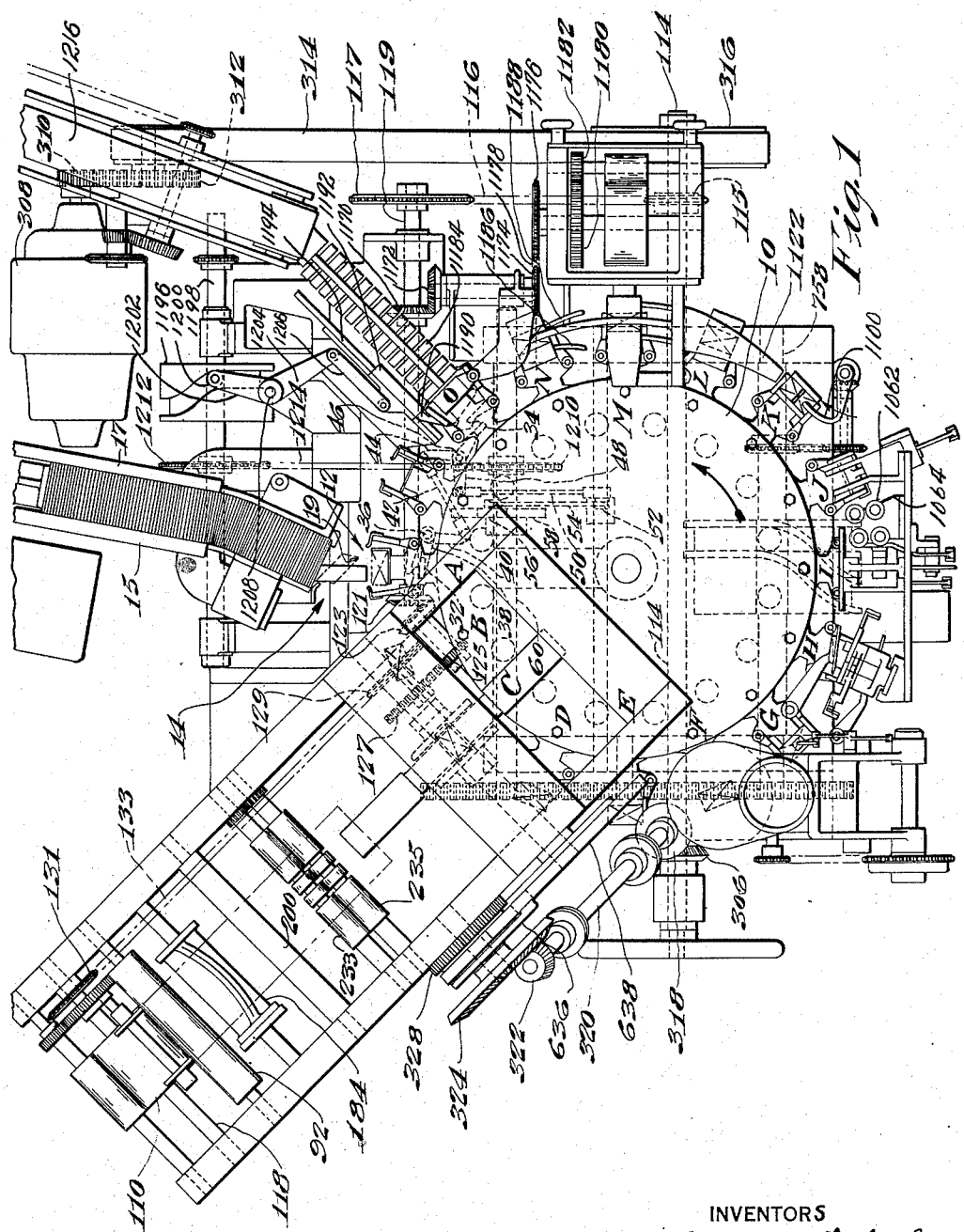
Figure 2:
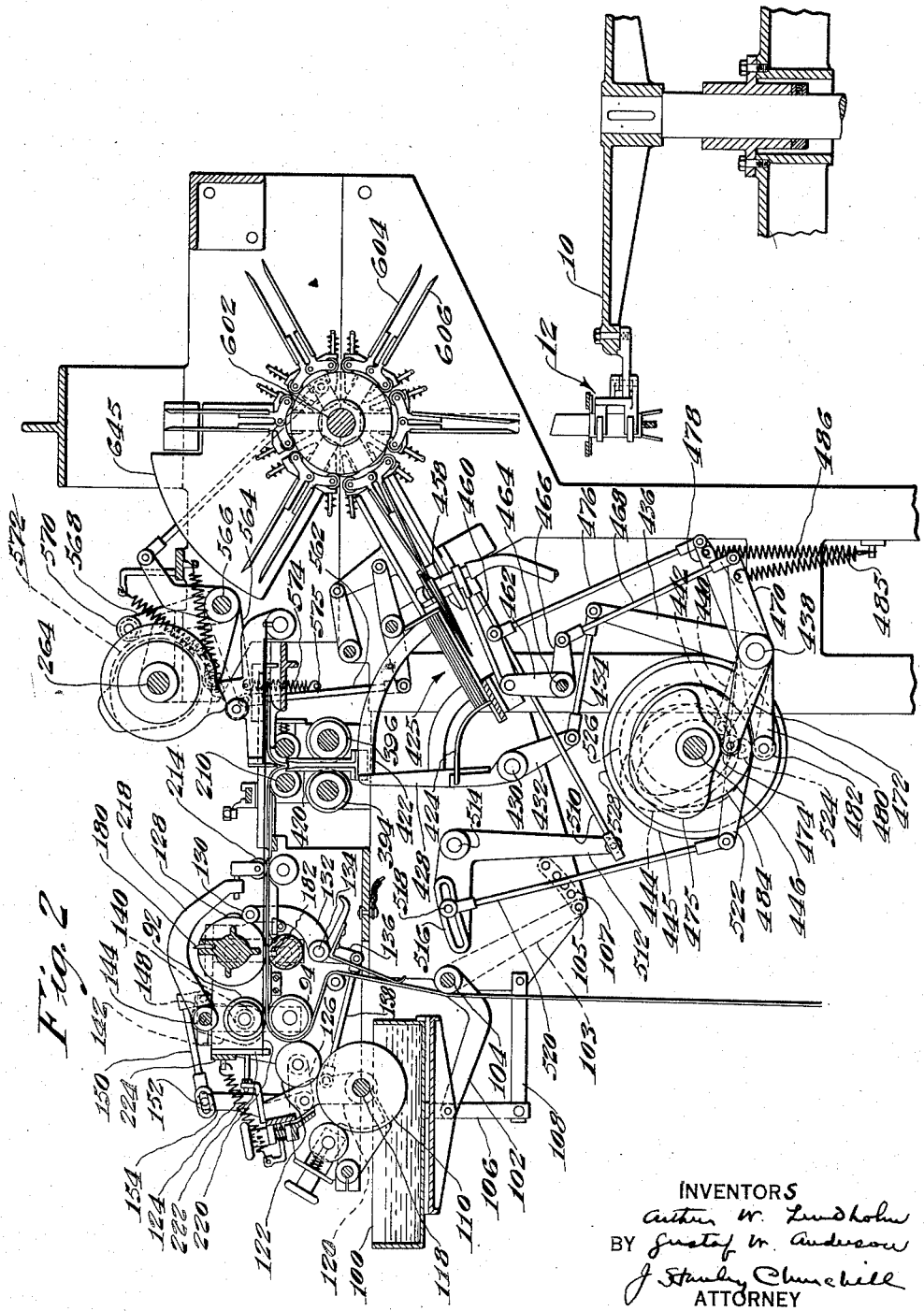
Figure 3:
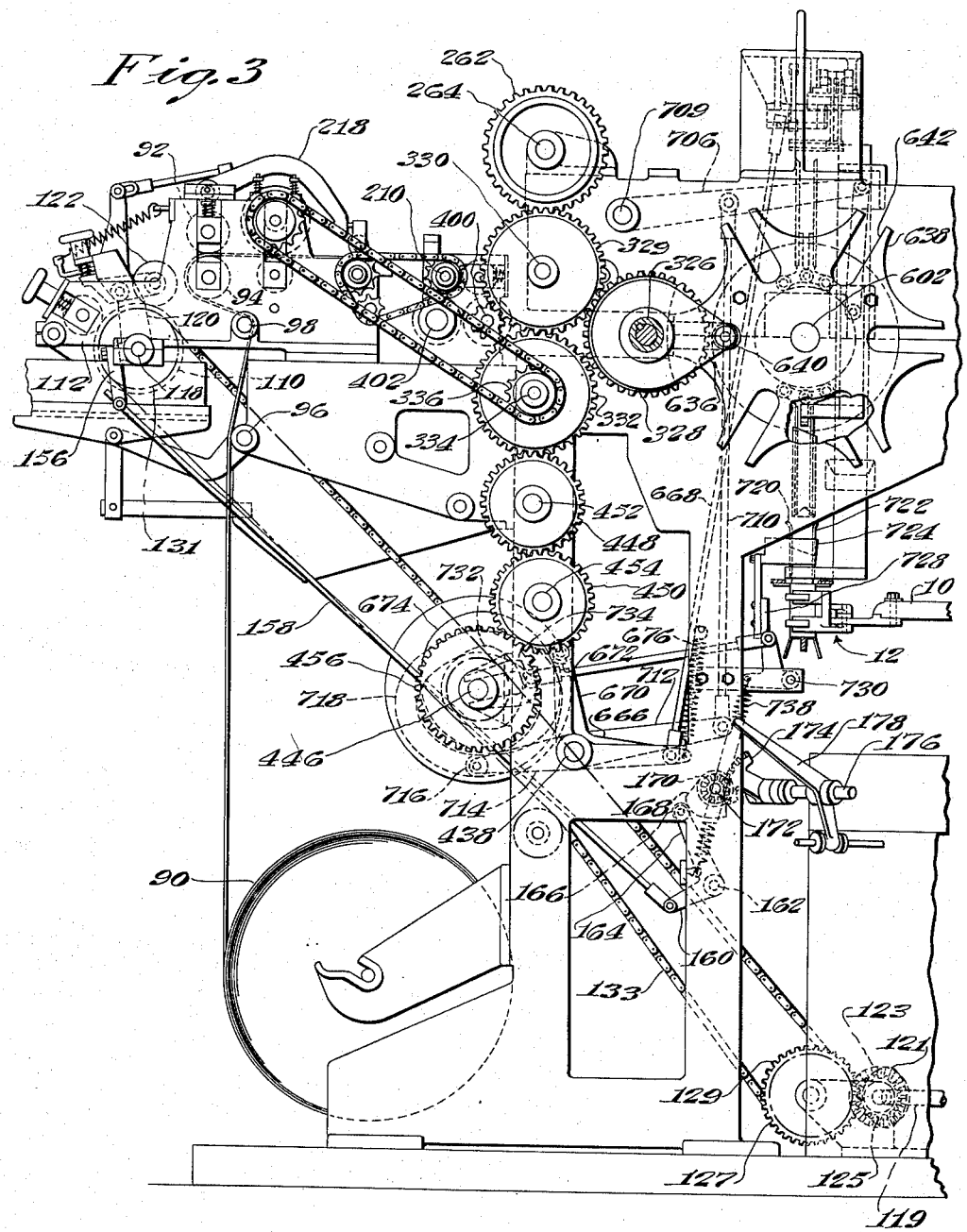
Figure 4:
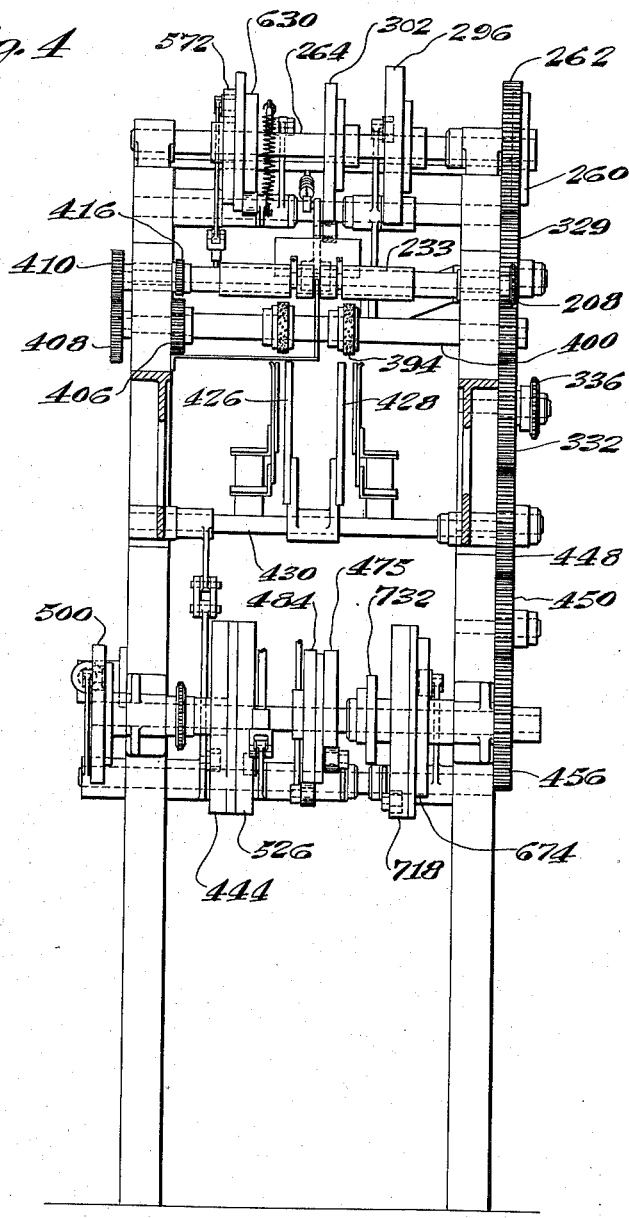
Figure 5:
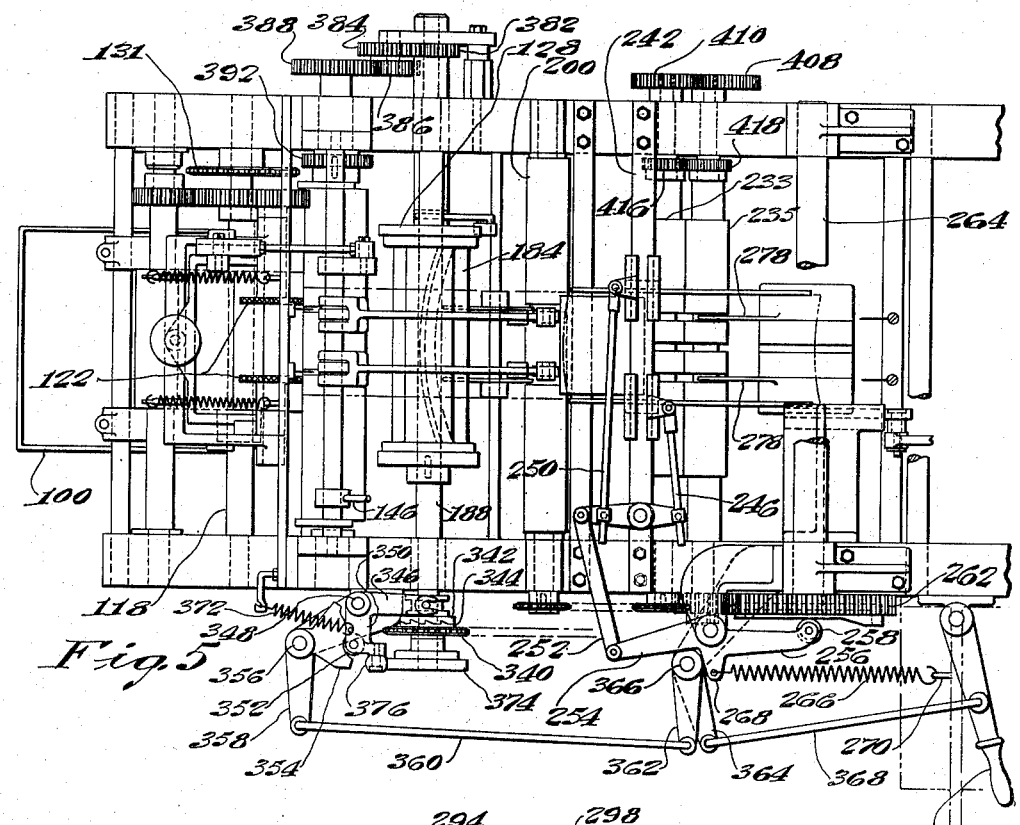
Figure 6:
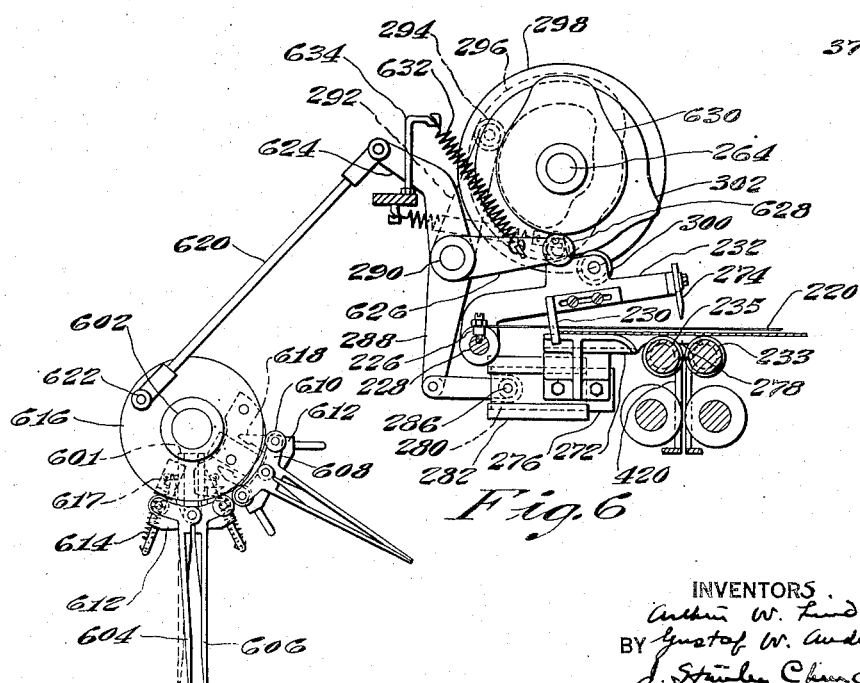
Figure 7:
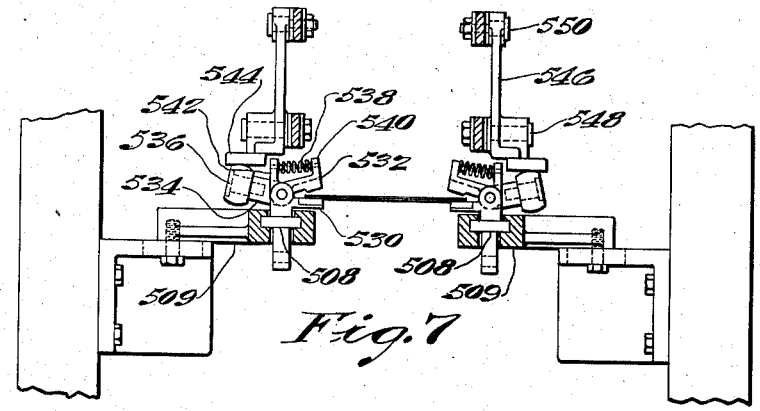
Figure 8:
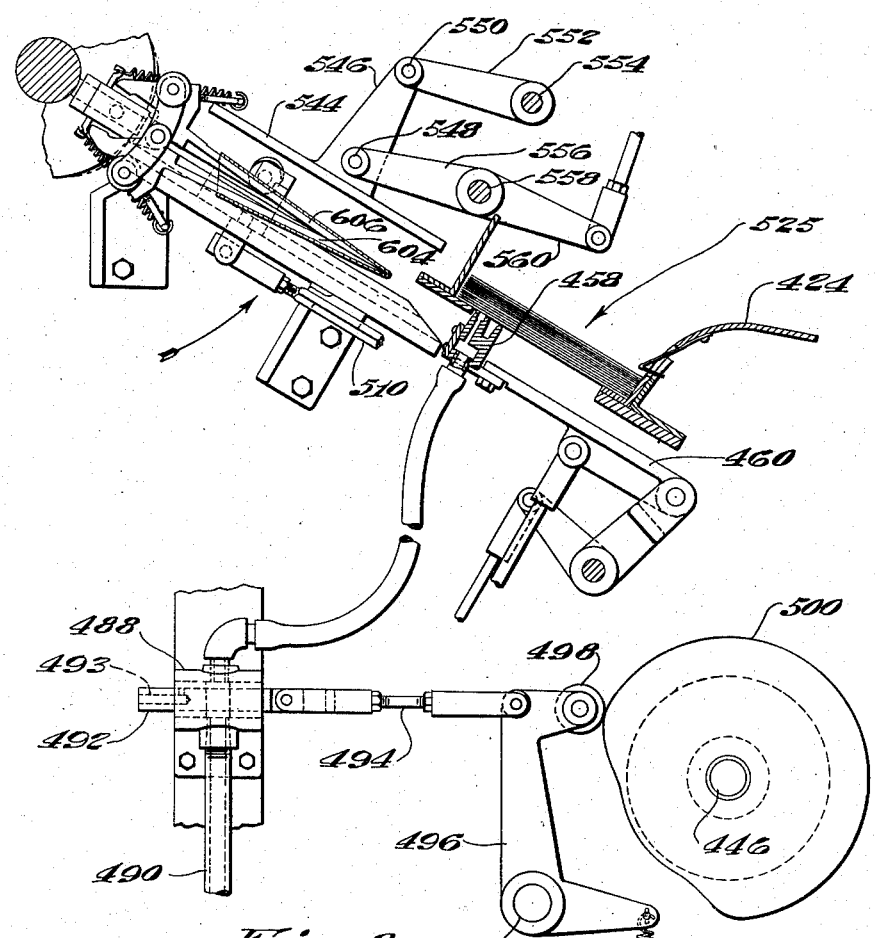
Figure 9:
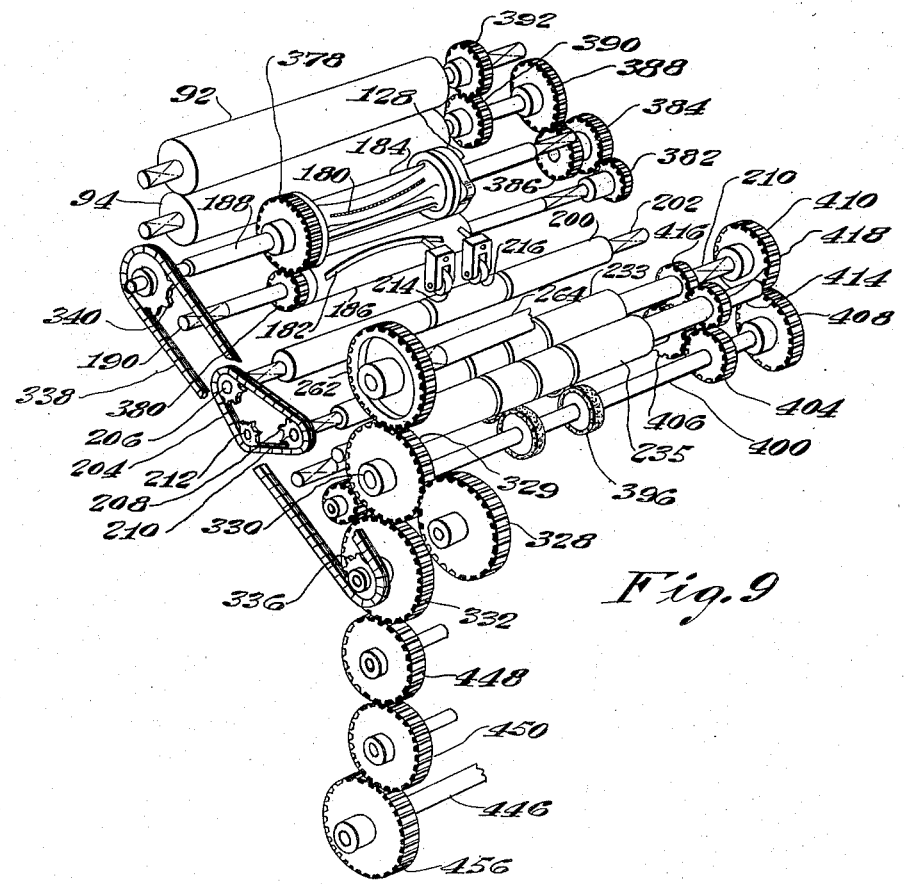
Figure 10:
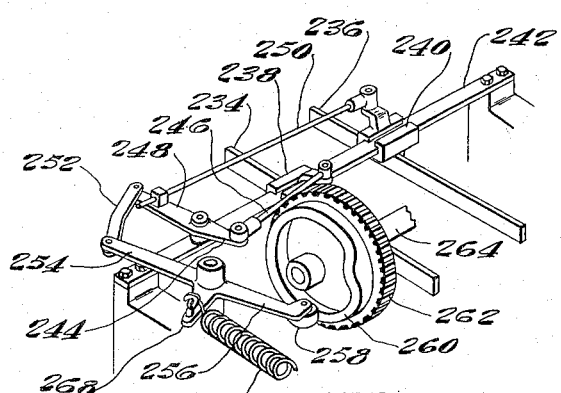
Figure 11:
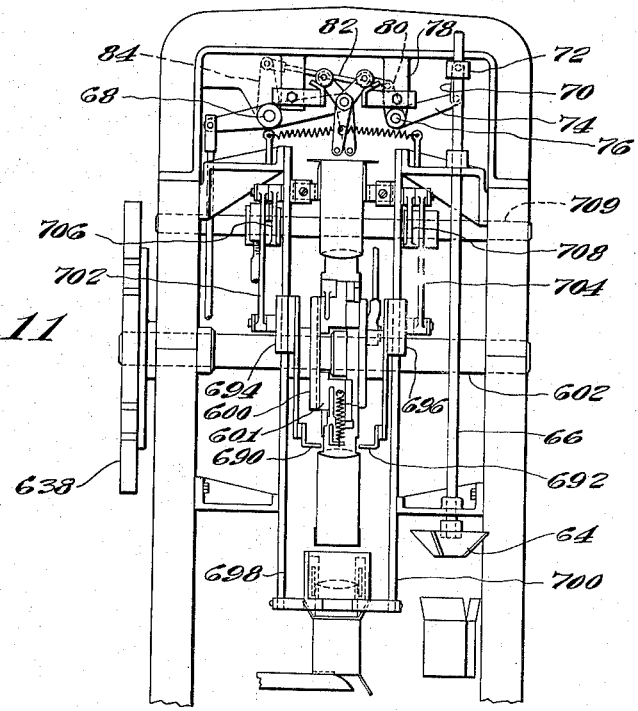
Figure 12:
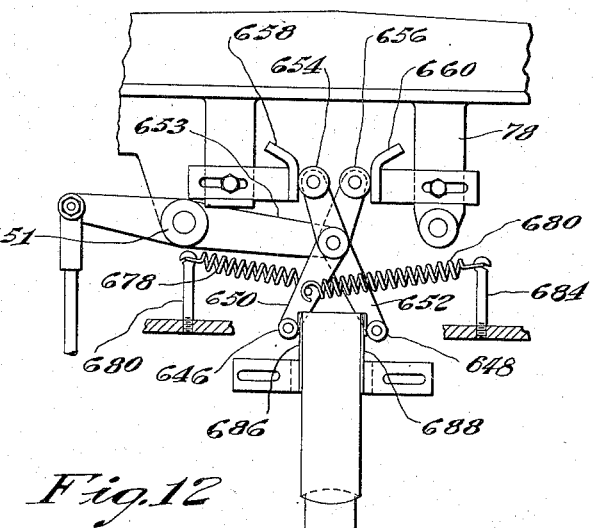
Figure 26:
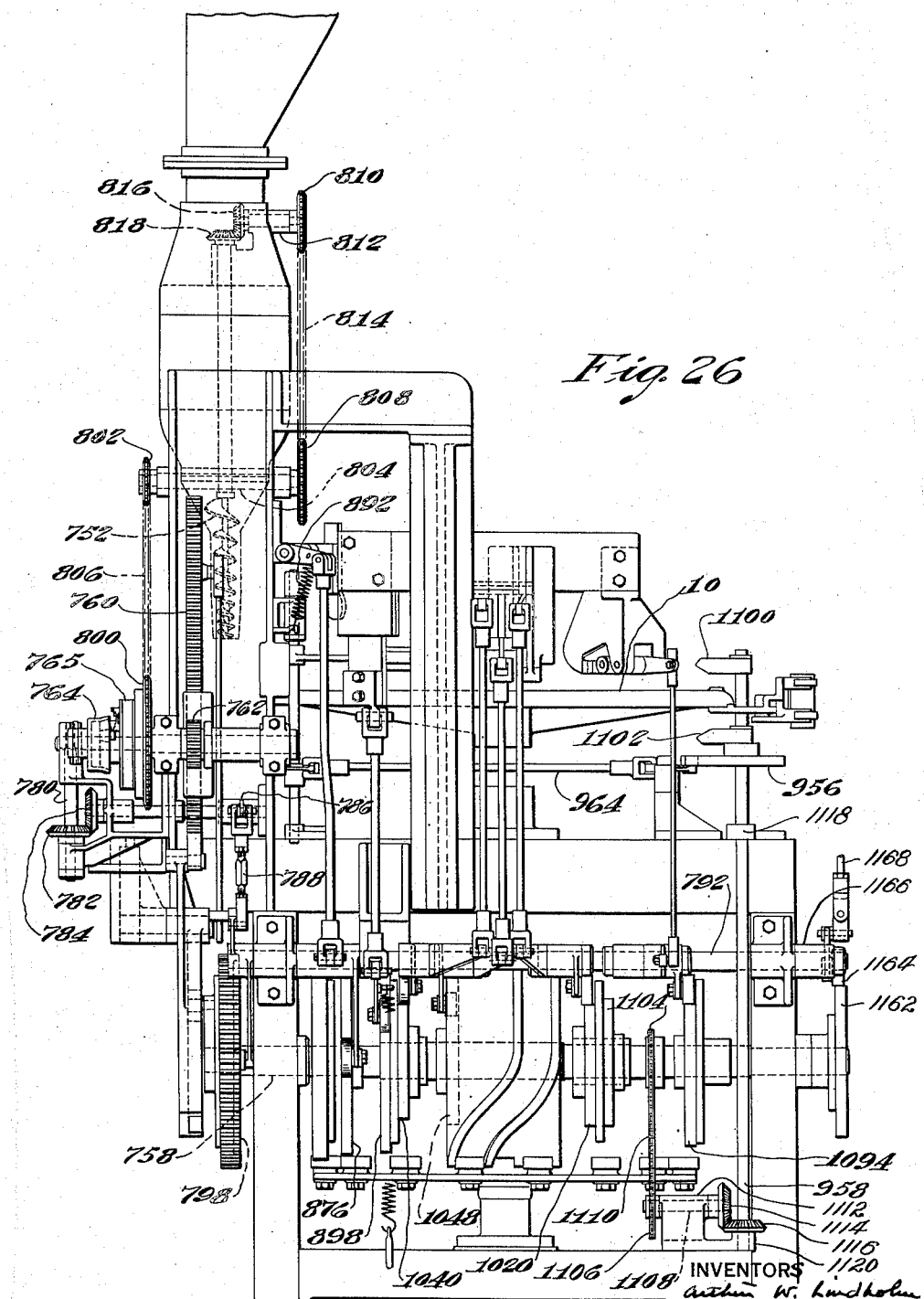
Figure 37:
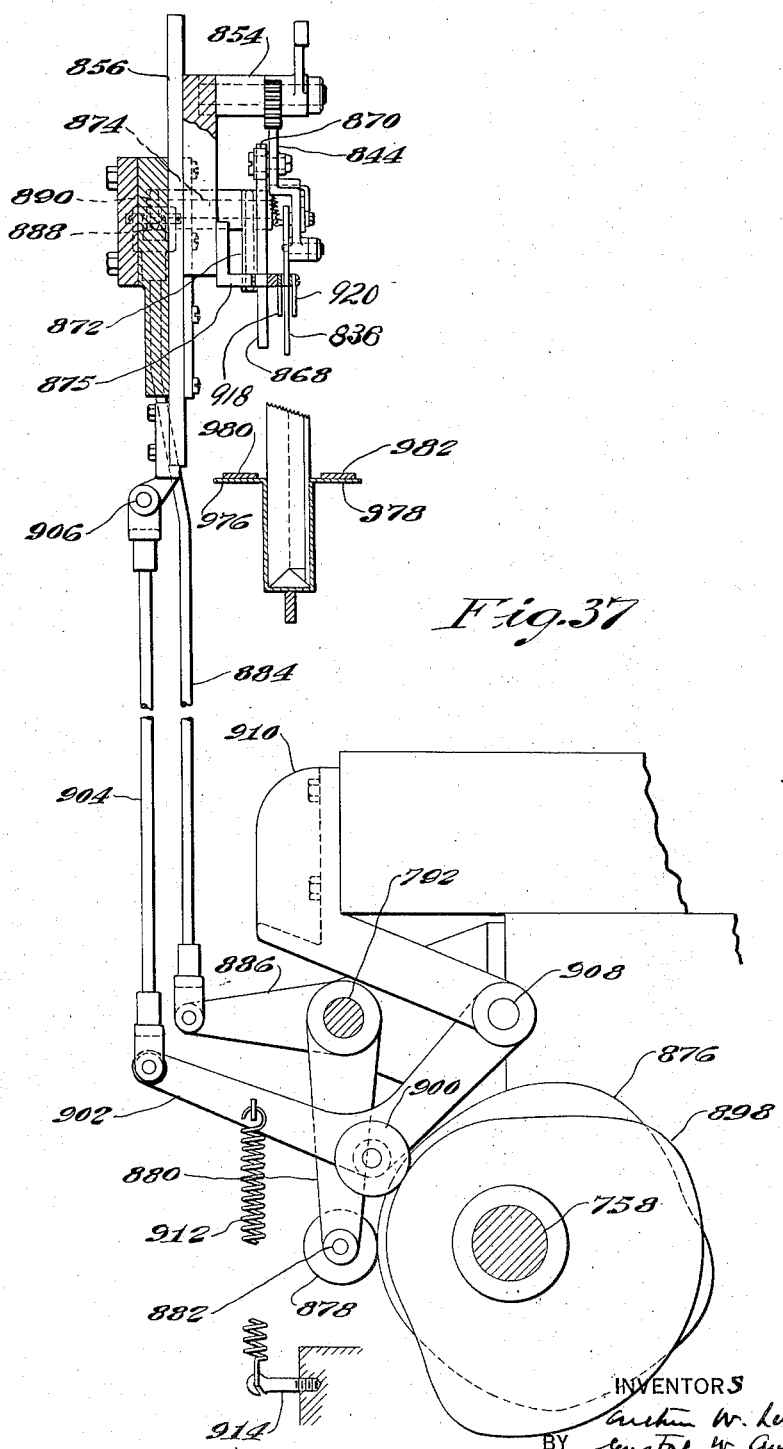

In the drawings illustrating the preferred embodiment of the invention, Fig. 1 is a more or less diagrammatic plan view of the complete packaging machine; Fig. 2 is a longitudinal sectional view through the lining forming mechanism of the machine shown in Fig. 1; Fig. 3 is a side elevation of the lining mechanism shown in Fig. 2; Fig. 4 is an end elevation of the lining mechanism shown in Figs. 2 and 3 viewed from the left; Fig. 5 is a detail in plan of a portion of the lining forming mechanism illustrating particularly the paper feed and adhesive applying rolls; Fig. 6 is a detail viewed from the left-hand side of the machine shown in Fig. 4, illustrating the folding mechanism for forming the lining from a lining blank; Fig. 7 is a sectional detail of gripping mechanism constituting a part of the liner feeding mechanism; Fig. 8 is a longitudinal sectional detail illustrating the mechanism for transferring the liner onto one of the liner supporting members; Fig. 9 is a detail in perspective illustrating the drive for the paper cutting, paper feeding, folding and gluing mechanism of the lining forming mechanism; Fig. 10 is a detail in perspective illustrating the mechanism employed for registering the lining blanks after they have been severed from the supply web of lining material; Fig. 11 is a detail of the portion of the lining mechanism by which the corner tabs projecting from the bottom of the liner are folded onto the body portion thereof, and also by which a liner is stripped from its supporting member; Fig. 12 is an enlarged detail of the tab folding mechanism shown in Fig. 11, illustrating the parts in a different position of operation; Figs. 13, 14, 15, 16 and 17 are views in plan and perspective illustrative of the successive steps in the formation of the preferred form of liner; Figs. 18, 19, 20, 21, 22, 23, 24 and 25, respectively, are views in perspective of the lined carton and liner itself illustrating the successive steps employed in closing the liner and in sealing and closing the top and bottom flaps of the carton to produce the complete package illustrated in Fig. 25; Fig. 26 is a front elevation of the machine shown in Fig. 1; Fig. 27 is an elevation of the machine shown in Fig. 1, viewed from the left and showing the feeding hopper; Figs. 28, 29 and 30 are details in side elevation and plan of the carton holding mechanism forming a part of the conveyor by which the cartons are conveyed to successive operating stations; Fig. 31 is a skeletonized front elevation of the machine shown in Fig. 1, illustrating particularly the conveyor drive and gluing mechanism; Fig. 32 is a plan view of a portion of the lining mechanism illustrating particularly the mechanism for closing the mouth of the liner; Figs. 33 through 36 are detail views in plan and elevation of the bag closing and folding mechanism illustrating the parts in succeeding positions of operation; Fig. 37 is a sectional detail illustrating the operating mechanism for operating the bag closing and folding mechanisms of Figs. 33 to 36; Fig. 38 is a sectional detail of the operating mechanism for folding the closed mouth of the liner; Figs. 39, 40 and 41 are details of the folding mechanism with the parts in different positions of operation; and Fig. 42 is a detail of the mechanism employed for pressing the folded portions of the mouth of the liner.

Referring now to the drawings, the different features of the invention have been illustrated as embodied in a complete machine in which provision is made for feeding collapsed cartons from a stack or supply thereof and for opening successive cartons and delivering them into successive carton holding devices forming a part of a movable endless conveyor. The latter functions to present the cartons to successive operating stations where a liner is introduced into the carton while the latter is held by the carton holding device on the conveyor, and thereafter the liner within the carton is presented to filling mechanism by which flowable solid material is introduced into the liner and the carton is operatively supported during movement by the conveyor in such manner as to retain the filled liner or bag therein during the movement of the carton prior to the closing and sealing of the bottom flaps at a subsequent station in the operation of the machine. After the liner has thus been filled, provision is made for closing the top of the liner preferably in a novel and improved manner, and by novel bag closing mechanism adapted to provide a type of closure which offers efficient resistance to the entrance of moisture and air to the contents of the liner. Provision is also made for tucking down the folded top portions of the bag into the interior of the carton, and thereafter as the carton with the filled liner therein is moved to a subsequent station, provision is made for closing the top and bottom flaps of the carton and for sealing the same, thus simplifying the mechanism required for sealing and closing the two sets of flaps. The completed packages are thereafter automatically discharged from the machine, preferably into the usual drying apparatus which has provision for retaining the closed flaps in their operative position until the adhesive or glue becomes set. While in the broader aspects of the invention preformed liners may be introduced into the cartons, nevertheless it is preferred to embody in the complete machine, mechanism for forming the liners in a novel and improved manner and for introducing the liners as they are formed into the cartons as they are presented to the liner forming mechanism by the conveyor, the liner forming mechanism being preferably driven in synchronism with the remaining operating elements of the machine to the end that the entire operation may be performed in an automatic, rapid and simplified manner.

As herein shown, the machine includes a rotatable conveyor preferably comprising a disk or spider 10 provided upon its periphery with a plurality of spaced carton holding and gripping members 12 adapted to receive opened cartons from carton feeding mechanism indicated generally at 14 and to operatively support the carton with its top and bottom flaps in open condition.

The carton feeding mechanism 14 may comprise any usual or preferred form of carton feeding mechanism now upon the market, such as is illustrated in the United States patent to Robinson No. 1,599,248, dated September 7, 1926, and such mechanism essentially comprises a magazine formed by guide rails 15, 17 between which a supply of collapsed cartons is maintained in a vertical position. Provision is made, during the operation of the machine, for inserting the usual knife member 19 to within the endmost collapsed carton and withdrawing it from the stack, opening it and introducing it between the opened clamping jaws of one of the carton holding devices 12 upon the rotary spider of conveyor 10. Inasmuch as the details of the carton feeding mechanism per se form no part of the present invention, reference is made to the foregoing United States patent No. 1,599,248 for a further and more complete disclosure and description thereof.

Referring now more particularly to Figs. 27, 28, 29 and 30, in the illustrated machine each carton holding device 12 includes two gripping members 16, 18 both of which are pivoted upon studs 20, 22 supported in a bracket 24 projecting from and secured to the periphery of the spider 10. The arms are connected by a coiled spring 26 which normally tends to urge them into carton engaging or closed position. The studs 20, 22 to which the arms 16, 18 are secured are also provided with inwardly projecting arms 28, 30 arranged to overlap at their ends, as illustrated, and are adapted to be moved outwardly from the spider 10 by movement of contact fingers 32, 34 which engage the rear arm 30 and through the rear arm effect movement of the forward arm 28 as well, when the fingers are swung outwardly. In the illustrated machine, as best shown in Fig. 1, a contact finger is located at the carton engaging and at the carton discharging positions, and during the operation of the machine provision is made for effecting the opening of the carton gripping members at these two stations and for permitting the carton engaging members to remain in their closed positions during the remainder of the operation of the machine and during the remainder of the travel of the conveyor. The actuating finger 32 at the carton engaging station is mounted upon one arm 36 of a bell crank loosely mounted upon a stud 38 to rock thereon, the second arm 40 of which is connected by a link 42 to one arm 44 of a bell crank secured to the vertical shaft 46, and the second arm of the latter bell crank is provided with the second actuating finger 34 for actuating the carton gripping members 16, 18 at the discharge station. The vertical shaft 46 is provided with a second arm 48 connected thereto which is connected by a link or connecting rod 50 to one arm 52 of a bell crank, the second arm 54 of which is provided with a cam roller 56 adapted to cooperate with an actuating cam 58 upon a cam shaft 60 driven as will be described. A coiled spring 62, see Fig. 27, serves to hold the cam roll 56 in engagement with the cam 58. As a result of this arrangement, when succeeding carton holding devices 12 arrive at the carton discharging and the carton receiving position, the cam 58 is so timed as to effect the opening of the carton engaging arms as above described, and as the conveyor leaves such stations the cam operates to permit the coiled springs 26 to close the arms.

During the operation of the machine, after a carton has been thus received between the opened carton engaging arms of the carton holding device at the receiving station, indicated at A (see Fig. 1), and thereafter the arms have been closed to grip and engage the carton, the conveyor operates to move the carton to a liner receiving station C through an intermediate station B. Provision is made for spreading the top flaps during the interval that the carton remains at the station B, and for this purpose, as herein shown, a flap spreading device 64, see Fig. 11, is moved downwardly to perform this operation. The flap spreading device is mounted on the lower end of a rod 66 arranged to slide vertically in suitable bearings in the machine frame, being reciprocated by a motion derived from an operating shaft 68 driven as will be described through connections including a link 70 pivoted to a collar 72 secured to the flap spreading rod 66, and the link is pivotally connected to an arm 74 constituting one arm of a bell crank pivoted upon a stud 76 mounted in the bracket 78 forming part of the machine frame. The second arm 80 of the bell crank is connected by a connecting rod 82 to a lever 84 secured to the operating shaft 68, so that as the operating shaft oscillates, the flap spreading rod 66 is reciprocated vertically. In this manner while the carton remains at station B the flap spreader 64 operates to spread apart the top flaps of the carton to facilitate the introduction therein of a bag or liner.

In the illustrated machine provision is made for forming successive bags or liners from a supply of paper and for automatically introducing them into successive opened cartons as the latter are presented to operating position with respect to the bag forming mechanism by the intermittent movement of the conveyor. The bag forming mechanism is best illustrated in Figs. 1 to 12 inclusive, and as therein shown, the bag forming material is withdrawn from a supply roll 90 by a pair of driven feed rolls 92, 94, the web being conducted over guide rolls 96, 98, as illustrated in Fig. 3. Provision is made for applying glue or other adhesive in narrow strips along the marginal edges of the web and in such manner as to provide gaps between successive lengths of adhesive, see Fig. 13, in order to permit the cutter mechanism to function to cut the individual bag forming blanks from the supply roll without liability of the glue or other adhesive contacting with the cutter, as will be described. For this purpose the machine is provided with a glue pot 100 pivotally mounted upon a pair of supporting arms 102 secured to a rock shaft 104 and by which the glue pot is adapted to be raised and lowered when the shaft is rocked. The glue pot 100 is further pivotally connected by side links 106 to a pair of pivotally mounted arms 108 which cooperate with the supporting arms 102 above referred to, to form in effect a four-bar linkage to impart a substantially straight-line movement in a vertical direction to the glue pot as the rock shaft 104 is rocked. The shaft 104 is rocked to raise or lower the glue pan, by an operating handle 103 and is held in its adjusted position by a pin 105 extending through one of the holes 107 in the machine frame. The glue pot 100 has running in it when in its elevated position an adhesive applying roll 110 journalled in suitable bearings in a bracket 112 forming a part of the machine frame and is arranged to be continuously driven from a main driving shaft 114 through connections including a sprocket 115 secured to the main driving shaft 114 which drives a sprocket 117 secured to the end of an intermediate shaft 119, through a chain 116, bevel gears 121, 123, spur gears 125, 127 and a sprocket 129 which drives a sprocket 131 secured to the glue roll shaft 118 through a chain connection 133. The glue roll shaft 118 is provided with a pair of upstanding arms 120 pivoted thereon forming a support for a glue transfer roll 122, and a spring 124 serves to yieldingly urge the glue transfer roll into contact with the paper web as the latter is drawn around the lower feed roll 94 as above described. The transfer roll 122 is pivotally supported upon arms 126 secured to the upstanding arms 120 above referred to, and as best shown in Fig. 2 the movements of the transfer roll against the action of the spring 124 and into contact with the paper web are effected by an operating cam 128 through a cam roll 130 on the upper end of a curved arm 132 secured to a cross shaft 134, the latter being connected through an arm 136 secured therethrough and a connecting rod 138 to the pivoted upstanding arms 120, so that during the major portion of each cycle of operation of the machine the glue transfer roll is in contact with the paper web, and at the proper time with relation to the subsequent operation of the cutter, as will be described, the operating cam 128 operates to move the transfer roll 122 away from the paper web, producing the gap, as shown in Fig. 13, between successive strips of the adhesive applied to the web. The transfer roll is maintained in contact with the adhesive applying roll at all times. Provision is made for rendering the adhesive applying mechanism inoperative and for permitting the feed of the paper web from the supply roll to be discontinued, and for this purpose the upper feed roll 92 is operatively supported in the hooked portion 140 of a pair of supporting arms 142. The supporting arms 142 are mounted free upon an eccentrically turned portion of the cross shaft 144, and the latter is provided with a handle 146 to permit the operator to turn the cross shaft 144 and through the eccentric connection to effect the raising of the supporting arms 142 and the upper feed roll 92 supported thereby. In this manner the engagement of the upper feed roll with the web is terminated and the feeding of the web discontinued. At the same time the rocking of the cross shaft 144 operates through an arm 148 secured to the cross shaft, and connected to one end of a connecting link 150 to cause the transfer roll supporting frame 120 to be rocked to the left, viewing Fig. 2, to disengage the transfer roll from the paper web. The end of the connecting rod 150 is slotted and receives a pin 152 on an upstanding piece 154 secured to the supporting frame 120. In this manner when the operator manually raises the upper feed roll 92 the glue transfer roll 122 is also moved to the left and out of engagement with the web.

Provision is also made for moving the adhesive transfer roll 122 out of engagement with the web in the event that the operating clutch 123 controlling the operation of the entire machine is thrown out, and for this purpose the machine is provided with an arm 156 attached to the glue roll supporting arm 120 and is connected by means of a connecting rod 158 to one arm 160 of a bell crank lever pivotally mounted on a stud 162 secured to the frame of the machine. The other arm 164 of the bell crank carries a roller 166 which cooperates with a cam surface 168 secured to a bevel gear 170 free on a stud 172 secured in the machine frame. The bevel gear 170 cooperates with a segment 174 secured to a clutch lever shaft 176 hence it will be seen that when the clutch lever 178 is thrown to stop the machine for any purpose the glue device is rendered inoperative. It will be noted that the glue supplying roll 110 and the transfer rolls 122 are permitted to rotate at all times even though the gluing device is rendered inoperative, in order to prevent the glue becoming dried and hard on any of the rolls or segments.

Provision is made for cutting the web of bag forming material transversely thereof to form successive bag forming blanks, and in the preferred form of the invention this operation is performed by cooperating cutter and die members 180, 182 secured to revoluble rolls 184, 186 mounted upon shafts 188, 190 driven as will be described. The cutter member 180 preferably comprises a serrated knife and both the cutter member 180 and die 182 are preferably curved so as to cut the web along curved lines indicated at 192, 194, in Fig. 13, so that in the final bag making blank thus produced one end of the blank is of concave formation and the other end convex. As a result of this formation of the ends of the blank, when the bag illustrated in Fig. 14 is produced by folding the blank about a central transverse line indicated at 196 in Fig. 13, the upper edges of the bag are disposed at different points thus facilitating the opening of the bag during the operation of forming the same into rectangular form and of folding the side portions thereof, as will be described.

After the glued sheet is cut off from the web, it is fed over an advancing roll 200 running at a slightly higher speed than the paper feed rolls 92, 94. The advancing roll is formed on a cross shaft 202 having bearings in brackets secured to the machine frame and is driven by means of a chain 204 running over a sprocket 206 secured on the end of the advancing roll shaft 202 and over a driving sprocket 208 secured to a folding roll shaft 210. An idler 212 is provided to keep the chain tight. Cooperating with the advancing roll are two rollers 214, 216 rotatably supported in the ends of arms 218 pivotally and adjustably mounted on the cross shaft 144. The upper transfer rolls 214, 216 frictionally engage the lower roll 200 to be driven therefrom. A pair of top guide wires 220 are provided to keep the paper from lifting while being folded. One end of these wires is attached to brackets 222 supported on the cross bar 224, the other end being secured to pins 226 in a cross shaft 228. As the paper is advanced through the machine by the advancing roll 200 it is brought to rest by an adjustable stop plate 230 secured to an arm 232 so that the paper is positioned over a pair of folding rolls 233, 235. In order to align the edges of the paper at right angles to the folding rolls side registering arms 234, 236 are provided which are operatively supported on sliding brackets 238, 240 arranged to slide on a bar 242 secured to the opposite sides of the machine frames. A two arm lever is pivotally mounted on the bar 242, one arm 244 of which is pivotally connected by a connecting rod 246 to the registering guide 238 and the second arm 248 is pivotally connected to the guide 240 by a connecting rod 250. The two arm lever is operated by a connecting rod 252 one end of which is connected to the arm 248 of the lever, and the other end is connected to one arm 254 of a two arm lever pivotally mounted in a bracket on the machine frame. The second arm 256 of the lever is provided with a cam roll 258 which cooperates with a cam 260 secured to a gear 262 mounted on a cam shaft 264. A spring 266 one end of which is secured to a projecting arm 268 on the two arm lever, the other end of which is secured to a spring eye 270 to a portion of the machine frame normally holds the cam roll 258 in engagement with the face of the cam to the end that the side registering guides 238, 240 are moved out positively by the cam and are brought into engagement with the edges of the paper by the spring.

A slidable bottom supporting plate 272 for the paper is arranged to project over the folding rolls 233, 235 while the paper is being positioned and registered and immediately thereafter is withdrawn to allow the paper to be forced down into the bite of the folding rolls by a blade 274 and comprises a sliding block 276 having narrow rails 278 formed thereon and slides in a guide way 280 formed in a bracket 282 secured to the machine frame. The slide is operated by means of a connecting rod 284 pivotally attached to a pin 286 secured to the slide 276 and to one end 288 of a two arm lever which is rockingly mounted on a cross shaft 290. The second arm 292 of the lever is provided with a cam roller 294 which cooperates with a cam path 296 formed in the cam 298 secured on the upper cam shaft 264.

When the paper comes to rest over the folding rolls 233, 235 the blade 274 is caused to move the paper downwardly into the bite of the rolls, whereupon the paper is folded to form a flat bag. The blade is secured to the cam lever 232 mounted to rock on the cross shaft 228 and is provided intermediate its length with a cam roller 300 which cooperates with a cam 302 secured on the upper cam shaft 264. This cam operates to move the blade and paper downwardly and a spring 304 is provided to hold the cam roll 300 in contact with the cam surface.

Provision is made for driving the feeding rolls, 92, 94, the cutter rolls, 184, 186, and the folding rolls 233, 235 in timed relation to one another, and as best illustrated in Figs. 3 and 9 these various rolls are driven from a bevel gear 306 on the drive shaft 114. The bevel gear 306 is driven from a motor 308 through reducing gears 310, 312 and a belt connection 314 to a clutch pulley 316 on the main driving shaft 114 of the machine, see Fig. 1. The main driving shaft of the machine is provided with the bevel gear 306 and is arranged to cooperate with a bevel gear 318 upon the lower end of a vertically inclined shaft 320. On the upper end of the inclined shaft 320 a bevel pinion 322 is arranged to mesh with a bevel gear 324 secured upon a short shaft 326 journalled in the machine frame. The shaft 326 is provided with a gear 328 fast thereon which is arranged to mesh with an idler gear 329 on a stud 330, and the latter gear in turn meshes with a second idler gear 332 on a stud 334. The second idler gear 332 is provided with a sprocket 336, and a driving connection is effected from the sprocket 336 through a chain 338 to a second sprocket 340 on the end of the shaft 188 upon which the upper cutter roll 184 is mounted.

In order to manually control the operation of the paper feed rolls 92, 94 and the cutter rolls 184, 186 so that this section of the machine may be stopped while the rest of the machine continues to run, a clutch is provided mounted on one end of the cutter roll shaft 188. See Fig. 5. The driven part 342 of the clutch is slidably secured to the shaft 188 and the driving part 344 is formed integral with the sprocket 340. One arm 346 of a bell crank pivoted on a stud 348, is forked to engage the clutch and the other arm 350 carries a cam roll 352 which cooperates with a cam piece 354 secured to a vertical shaft 356. The vertical shaft is rocked to disengage the driving connections through linkage including a lever 358 secured to the vertical shaft 356, a connecting rod 360, levers 362, 364 secured to a vertical shaft 366, connecting rod 368 and operating handle 370. A spring 372 normally urges the clutch into engaging position. When the operating handle 370 is moved the cam piece 354 is rocked clockwise viewing Fig. 5 so that the high part of the cam engaging the roller 352 will disengage the clutch. It is desirable for the cutter roll 184 to come to rest in such a position that the high part of the cam 128 will be in position to hold the transfer roll 122 out of contact with the paper web and for this purpose a cam 374 is provided on the end of the shaft 188 which cooperates with a second roll 376 on the arm 350. The cam 374 is so formed that it will prevent the clutch from being disengaged until the cam 128 is in the desired position.

Provision is made for driving the lower cutter roll 186 from the upper cutter roll 184, and for this purpose the upper cutter roll shaft 188 is provided with a gear 378 which is arranged to mesh with a gear 380 on the lower cutter roll shaft 190 as clearly shown in Fig. 9. The lower cutter roll shaft 190 is provided with a second gear 382 which is arranged to drive the lower feed roll 94 through a compound idler 384, 386 and a gear 388 on the end of the lower feed roll 94. Provision is made for driving the upper feed roll 92 from the lower feed roll 94 through a pair of cooperating gears 390, 392 as shown.

In order to drive the folding rolls 233, 235 and also a pair of transfer rolls 394, 396 the gear 329 is arranged to mesh with a pinion 398 secured on the end of one of the transfer roll shafts 400. The second transfer roll shaft 402 is driven from the first transfer roll shaft 400 through a pair of cooperating gears 404, 406 fast upon said shafts 400, 402 respectivey, as shown in Fig. 9. In order to drive the folding roll shafts, 233, 235 the transfer roll shaft 400 is provided with a gear 408 upon the end thereof which is arranged to mesh with a gear 410 on the extended end of one of the upper feed roll shafts 210. The upper feed roll shafts 210, 414 are geared together through a pair of cooperating gears 416, 418 fast on said shafts, 210, 414 respectively. The upper cam shaft 264 is driven from the idler 329 meshing with the gear 262 mounted on the cam shaft.

In the operation of the machine as the folded sheet is projected downwardly between the folding rolls 233, 235 and the transfer rolls 394, 396 it is guided by a slotted bracket 420 supported from the frame of the machine and after passing this bracket it is further guided by arcuate shape guides 422 until it is finally brought to rest on an arcuate shape plate 424 forming a part of a receiving magazine 425 for the folded sheets.

Provision is made for sweeping the thus folded sheet into the magazine 425 from which the bottom sheets are thereafter withdrawn to be opened into bag form and to this end a pair of arms 426, 428 are provided which are secured to a cross shaft 430 rockingly mounted in the side frames of the machine and to which is secured an arm 432 the end of which is connected by a connecting rod 434 to one arm 436 of a bell crank cam lever rockingly mounted on a cross shaft 438. The other arm 440 of the bell crank lever carries a roll 442 which cooperates with a cam path 444 of a cam 445 secured to the lower cam shaft 446. The sheets are thus piled one upon another in the magazine to form a substantial supply from which they may be thereafter fed to the opening mechanism and during storage in the magazine, sufficient time is afforded to permit the glue to dry or set. The lower cam shaft 446 is driven in timed relation to the rest of the machine from the gear 332, see Fig. 3 through idlers 448, 450, mounted to rotate on studs 452, 454 in the machine frame, and a gear 456 secured to the cam shaft 446.

From the description thus far it will be observed that a web of paper fed from a roll has been formed into flat bags and deposited in a magazine. The next step in producing the lining for the carton is to remove the lowermost flat bag in the magazine by suction operated means and advance the bag to a position where one of a series of collapsible forming blocks in the collapsed state is arranged to lift the extended flap of the bag preparatory to being drawn up over the forming block. Provision is made for drawing the bag up over the collapsed forming block and as the forming blocks are rotated various operations are performed to complete the lining until it is stripped off the block and introduced into the carton on the rotatable conveyor. For removing the bottom sheet from the stack in the magazine a suction separating mechanism is provided which comprises a suction nozzle or turret 458 mounted on the end of an arm 460 pivotally secured to one arm 462 of a bell crank lever mounted free to turn on a cross shaft 464, the other arm 466 of the bell crank lever is connected by means of a connecting rod 468 to one arm 470 of a two arm cam lever. The second arm 472 is provided with a cam roller 474 cooperating with a cam 475 mounted on the lower cam shaft 446 which imparts a rocking motion to the bell crank lever thus imparting in substance an oscillating motion parallel to the surface of the bottom of the magazine. In order to cause a downward or retracting motion to the suction turret arm 460 to thereby detach the lowermost bag from the stack in the magazine 425, a connecting rod 476 is provided, one end of which is pivotally connected intermediate the arm 460. The other end is connected to one arm 478 of a two arm lever pivoted on the cross shaft 438 and the other arm 480 of the two arm lever carries a cam roll 482 which cooperates with a cam 484 secured to the lower cam shaft 446. Both aforesaid cam levers 470, 478 are provided with springs 485, 486 which act to hold the cams against the cam rollers. It will thus be seen that the suction turret 458 has a movement upward to contact with the bottom-most bag, a retracting motion to detach the bag from the stack, and a forward movement to carry the bag into position to be drawn up onto the forming blocks. The suction turret 458 is connected through a valve 488 and piping 490 to the usual form of vacuum pump for creating the suction to remove the bag. The valve comprises a piston 492 having suitable ports 493 and is operated in timed relation with the machine by connections including a connecting rod 494 and a lever 496 pivotally mounted on the cross shaft 438. The lever is provided with a cam roll 498 cooperating with a cam 500 secured on the lower cam shaft 446. It will thus be seen that when the suction turret is brought into contact with the bottom-most bag the valve is caused to open, thus applying the suction in order to thereby remove the bag from the magazine.

After the bottom-most bag has been removed from the magazine 425 it is held in position by the turret 458 until gripped on each side by a pair of grippers 502, 504 which grip and draw the bag onto the former. These grippers are formed on sliding members 506, 508 which are mounted to slide in slide brackets 509 secured to each side of the machine. Each slide is operated to draw the bag onto the former through connections including connecting rods 510, levers 512 secured to a rock shaft 514, and a second arm 516 secured to the rock shafts. The arm 516 is provided with an arcuate adjustment slot in which is supported an adjustable pivot pin 518 connected by a connecting rod 520 to the outer end of a cam lever 522 rockingly mounted on the cross shaft 438. The lever 522 is provided a cam roll 524 cooperating with a cam path 526 formed in the side of a cam 528 secured on the lower cam shaft. Each sliding gripper 506, 508 comprises a stationary lower jaw 530 and a rocking upper jaw 532 pivotally mounted in the lower jaw. Formed on the upper jaw 532 is a boss 534 supporting a ball-like roller 536 which is arranged to open and close the jaw. A spring 538 placed between a projection 540 extending from the upper jaw and a projection 542 extending from the lower jaw serves to close the gripper. The grippers are opened by an elongated flat plate 544 coming in contact with the rolls 536 to press them down and thus open the jaws at the proper time, one such plate being provided for each gripper. Each of these plates is provided with an upstanding arm 546 located intermediate its length and is provided with a pin support 548 at the base of the arm and a second pin 550 at the extremity of the arm. The upper pin 550 is connected to the end of an arm 552 secured on a cross shaft 554 and the lower pin 548 is connected to an arm 556 secured to a cross shaft 558 in effect producing a straight line up and down motion to the plate. The latter cross shaft has imparted to it a rocking motion to operate the cam plates 544 through connections including an arm 560 secured to a cross shaft 558, a connecting rod 562 connected to one arm 564 of a bell crank lever rockingly mounted on a cross shaft 566. The other arm 568 carries a roller 570 which cooperates with a cam 572 mounted on the upper cam shaft 264. A spring 574, one end of which is secured to the arm 564, the other end of which is secured to a spring stud 575 fastened to the machine frame, acts to keep the roller 570 against the cam 572 thus in effect moving the cam plates 544 upwardly allowing the gripper jaws to close while the cam 572 acts positively to push down on the gripper rollers 536 to open the gripper jaws.

The bag forming spider comprises six collapsible forms mounted on a disk 600 secured to the cross shaft 602 rotatably mounted in the machine frame. Each former comprises two flat plates 604, 606 of the same width as the wide side of the bag to be formed and are normally held in their opened position or in the shape that the bag is to take. The plates 604, 606 are pivotally mounted together in their base 601 and are provided with a lug 608 as shown, for supporting a cam roll 610 and also with a lug 612 for supporting one end of a spring 614. The cam rolls 610 cooperate with an oscillating cam 616 which is mounted free to rock on the spider shaft 602 and the cam is so arranged and operated that the formers are in collapsed position as they approach the flat bag as the previously described gripper mechanism has transferred it from the suction feed of the magazine. The springs 614, one end of which is secured to the lug 612, the other end being secured to the supporting form block 601, tend to keep the formers in open position, or in other words, to keep the cam rollers against the cam. Stop lugs 613 are also provided which rest against the supporting blocks 601 to normally hold the formers in their open position.

The rocking cam 616 which opens and closes the former sides 604, 606 is operated by means of a connecting rod 620, one end of which is pivotally mounted on a pin 622 secured in the cam disk 616. The other end of the connecting rod is connected to one arm 624 of a bell crank lever mounted to rock on the cross shaft 290, the other arm 626 of the bell crank lever being provided with a cam roll 628 cooperating with a cam 630 and secured on the upper cam shaft 264. A spring 632, one end of which is secured to the arm 626 of the bell crank lever, the other end being secured to a spring bracket 634 fast to the machine frame, operates to keep the cam roller against the cam surface.

The bag forming spider has intermittent motion imparted to it through a Geneva mechanism of usual construction comprising a driver 636 secured to the driving shaft 326 and a Geneva spider 638. A roller 640 on the driver cooperates with the slots 642 in the spider.

As the spider comes to rest at the gripper station with a former in collapsed position, the upper end of the former strikes the long projecting side of the bag and opens it up while the suction is still holding down the lower side. The grippers then operate to slide the thus partially opened bag onto the collapsed former at which instant the grippers are released and the former cam 616 is caused to rock to spread the former plates thereby opening the bag. It is to be noted that while one former is collapsed at the bag receiving position, another former is likewise collapsed at the bag discharging position or where the completely formed bag is deposited into the waiting carton.

As the former swings upwardly with the bag thereon, the glued side seams come in contact with fixed guide pieces 645 which act to drag or wipe the extended side seams back against the narrow sides of the bag.

When the former reaches a vertically upright position, (the bag being then in an inverted position), provision is made for folding down the projecting ends of the side folds over the narrow sides of the bag. This device comprises a pair of elongated rollers, 646, 648, mounted on the ends of levers 650, 652 pivoted to one arm 653 of an operating lever 651 which operates to raise and lower the levers 650, 652. Cam rollers 654, 656, mounted on the other ends of the levers 650, 652, cooperate with fixed cam pieces 658, 660 secured to the machine frame so that as the levers 650, 652 are raised and lowered the elongated rollers 646, 648 will be given a spreading motion which is effective to fold the triangular shaped extended ends of the side seams downwardly against the narrow sides of the bag. Springs 678, 680 secured at one end to the levers 650, 652 and at the other end to spring studs 682, 684 tend to hold the cam rolls 654, 656 against the fixed cams 658, 660. The operating lever 651 is pivoted at 68 and a second arm 664 is connected by a connecting rod 668 to one arm 666 of a cam lever. The cam lever is pivoted on the cross shaft 438 and the other arm 670 carries a roller 672 which cooperates with a cam 674 mounted on the lower cam shaft 446. A spring 676 tends to hold the roll against the cam. Two stationary side guards 686, 688, positioned adjacent the bag when it arrives at the inverted position, serve as supports at the sides of the bag so that the elongated rollers 646, 648 operate to make a square fold. The third arm 84 of the operating lever 651 forms the operating connection to the flap spreading device above referred to.

Provision is made for stripping the completely formed bag off the former and into the open carton on the rotatable conveyor and for this purpose fingers 690, 692 are provided which are attached to slide members 694, 696 arranged to slide on the vertical guides 698, 700 secured to the machine frame. The slide members 694, 696 are connected by links 702, 704 to operating arms 706, 708 which are secured to a rocker shaft 709. A connecting rod 710 pivotally attached intermediate the arm 706 is connected at its other end to one arm 712 of a two arm lever pivoted on the cross shaft 438. The other arm 714 of the two arm lever carries a cam roll 716 which cooperates with a cam 718 mounted on the cam shaft 446. It will thus be seen that a vertically reciprocating motion is imparted to the fingers 690, 692 which effects the transfer of the bag from the former and into the carton. A cam piece provided on the disc 616 operates to collapse one plate 604 of the former to permit the bag to be drawn off.

During the transfer of the bag from the former and into the carton, the bag is guided by stationary guides 720, 722 on the wide sides of the bag. In order to guide the narrow sides so that the bag will enter the carton squarely, movable guides 724 are provided. These guides are attached to a lever 728 pivoted at 730 to the machine frame. A rocking motion is imparted to the lever 728 through connections including a cam 732 mounted on the cam shaft 446, a cam roll 734 mounted on a fork which embraces the shaft 446 and which cooperates with said cam and a connecting rod 736 pivotally attached intermediate the lever 728. A spring 738 urges the cam roll 734 against the cam 732 to the end that the guides 724 are rocked out of the way of the stripper fingers after they have served their purpose of guiding the end of the bag squarely into the carton.

Referring now to Figs. 1, 26, 27, the lined carton is presented to the filling mechanism at station F after being advanced through the idler stations D and E. The illustrated filling mechanism comprises a feeding hopper 750 which deposits a predetermined quantity of goods into the liner in the carton. In order to feed the goods from the hopper into the lined carton, a rotatable worm 752 is provided which extends into a funnel 754 at the mouth of the hopper. A shutter 756 is also provided to prevent leakage from the mouth of the hopper when the worm is idle.

The rotations of the worm 752 are controlled from the main cam shaft of the machine 758 and the worm is caused to rotate through a rack 760 and pinion 762 and a cam operated clutch 764. The rack 760 is connected to a swinging arm 766 adjustably pivoted at 768 and the swinging arm is provided with a slot 770 formed in an angular portion thereof, which cooperates with a roll 772 secured in a disc 774 at the end of the cam shaft, to the end that when the disc revolves it imparts a quick return motion to the arm 766 and hence to the rack 760. The pinion 762 is secured to a shaft 776 on which the driving member 764 of the clutch is also slidingly secured. The driving member is arranged to engage and disengage the driven member 765 through connections including a shifter arm 778 mounted on a vertical shaft 780, bevel gears 782, 784, lever 786, and a connecting rod 788 connected to one arm 790 of a bell crank pivoted on a rocker shaft 792. The other arm 794 of the bell crank carries a roller 796 which cooperates with a cam 798 secured to the main cam shaft 758. The driven member 765 of the clutch is provided with a sprocket 800 formed integrally therewith which is connected to a sprocket 802 on a shaft 804 by a chain 806. A sprocket 808 also secured to the shaft 804 is connected to a sprocket 810 on a shaft 812 by a chain 814 and a bevel gear 816 on the shaft 812 cooperates with a bevel gear 818 mounted at the top of the vertical worm 752. The chain 814 also runs over a sprocket 820 which drives a stirrer 822 for agitating the goods in the hopper.

The shutter 756 is operated by the same cam 798 that operates the clutch through connections including a connecting rod 824 connected to the arm 796, a lever 826 secured on the end of a shaft 828 rockingly mounted in a bracket 830 secured to the machine frame. A second lever 832 secured to the shaft 828 is connected to the shutter by a connecting rod 834. A spring 835 connected to the shutter lever 756 tends to keep the shutter closed when not actuated by the cam 798, the connecting rod being slidingly attached through the swivel connection 837 on the lever 832. The cam roller 796 is held against the cam 798 through a spring 839.

In the operation of the machine the carton is now successively presented first to station G and then to station H where provision is made for making a bellows fold in the sides of the liner as shown in Fig. 19 preparatory to folding down the top of the liner to form a closure. Referring now to Figs. 32 to 37 inclusive, the bellows fold mechanism preferably comprises a pair of movable fingers 836, 838 which, in cooperation with a relatively stationary guiding member 840, are adapted to descend from an elevated position into operative engagement with the liner and upon subsequent movement of the fingers to move the narrow sides of the liner inwardly to form a bellows shaped fold. As herein shown the fingers 836, 838 are pivoted at 841, 843 on the ends of levers 842, 844 and are arranged to operate in unison by intermeshing segments 846, 848 provided on the swinging levers 842, 844. The levers 842, 844 are pivoted at 850, 852 in a sliding bracket 854 which is secured to a vertical slide 856. Springs 858 attached to the segments 846, 848 at one end and to pins 860, 862 secured to the slide 856 at the other end, tend to hold the levers 842, 844 in their outward position as shown in Fig. 34 and extended lugs 864, 866 on the levers, which butt together when the levers are spread apart, serve as a stop to limit the outward movement of the levers 842, 844. Referring now to Figs. 26, 32, 34 and 37, the levers 842, 844 are arranged to be rocked inwardly through connections including a rocking cam piece 868 which cooperates with a roller 870 mounted on one of the levers 844 when the folding unit is lowered to form the folds, as will be described. The cam piece is carried by a lever 872 secured to a shaft 874 which is mounted in a bracket 875 secured to the machine frame. As herein shown the shaft is rocked from a cam 876 fast on the cam shaft 758, the periphery of the cam working on a cam roller 878 attached to one arm 880 of a bell crank by means of a stud 882. A connecting rod 884 is pivotally attached to the second arm 886 of the bell crank and rocks the shaft 874 through swivel connections 888 on the end of a lever 890 secured to the shaft 874. A spring 892 is connected to the lever 890, one end of said spring being attached to the machine frame and operates to keep the cam roller 878 on the surface of the cam 876. The bell crank is pivotally mounted on the rocker shaft 792.

Provision is made for lowering the folding unit into operative relation to the liner and for raising the unit to allow the liner to pass on to the next station and as above stated the folding unit is mounted on a vertical slide 856 which is arranged to slide in a bracket 894 secured to a supporting plate 896 mounted on the machine frame. The slide is operated from a cam 898 fast on the cam shaft 758 through a cam roller 900 attached to a cam lever 902. A connecting rod 904 is pivotally connected to the end of the lever and operates the slide 856 through a pivotal connection 906 secured to the lower end of the slide. The cam lever is pivotally mounted on a stud 908 fast in a bracket 910 attached to the machine frame. A spring 912 is connected to the cam lever, one end of said spring being attached to a spring stud 914 secured to the machine frame and operates to keep the roll 900 against the cam 898. In operation when the carton with its filled liner comes to rest at station H the folding unit is lowered and during its descent the first action of the fingers 836, 838 is to effect the spreading of the end flaps 915, 917 of the carton. This is accomplished by a high spot 916 on the cam piece 868 which causes the fingers to be first drawn in and then spread apart again, to avoid the aforesaid flaps. When the folding unit has descended into operative engagement with the liner the cam piece 868 is rocked and through the connections described causes the fingers 836, 838 to draw the narrow sides of the liner inwardly between extended forming members 918, 920, see Figs. 36, 37, secured to the guide 840. The fingers 836, 838 are normally held in a vertical position by the attached springs 922, 924, one end of said springs being attached to brackets 926, 928 secured to the levers 842, 844. Stop lugs 930, 932 are provided on the levers to hold the fingers in the vertical position. As the fingers are drawn inwardly against the narrow sides of the bag, the springs allow the fingers to yield and form a natural fold and to thereby produce in effect a bellows shaped fold as shown in Fig. 19.

The package is now in condition to be presented to the top folding station I where the operations illustrated in Figs. 20, 21, and 22 are performed, but previous to these operations the folded liner is pressed together to hold the bellows shaped fold and is guided in this position during its travel from station H to station I by movable guide plates 934, 936, see Figs. 32, 33. These guide plates are attached to levers 938, 940 which are pivoted on vertical studs 942, 944 mounted in a bracket 945 secured to the machine frame. The presser and guide plates are arranged to operate simultaneously through provision of an arm 946 secured to the stud 944 provided with a flat surface 948 against which a roller 950 attached to an arm 952 secured to the stud 942, is caused to bear by a spring 954 which urges the arms together. The plates are brought together after the bellows fold has been made and are operated from a cam 956, see Fig. 32, secured to a vertical shaft 958, cooperating with a cam roll 960 carried on a lever 962. A connecting rod 964 attached to the lever 962 is connected to the end of a lever 966 which is secured to the rocker stud 942. The cam lever 962 is pivoted at 968 and a spring 970 attached to an extension 972 of the lever is connected at one end to a stud 974 in the machine frame, to hold the roll 960 against the periphery of the cam 956 and also to assist the spring 954 in providing additional pressure to set the completed fold. It will be seen, from an inspection of Figs. 32, and 37 that the side flaps 976, 978 have been previously engaged by radial side rails 980, 982 to lay the flaps down at right angles to the carton. Provision is now made for laying down the leading end flap 915 so that as the carton is advanced, the flap will be tucked under a pair of guide rails 984, 986. These rails are spaced apart to allow the folded liner to pass through and to guide the extended ends of the liner to station I. As the carton progresses the rear end flap is also forced down under the guide plates 984, 986 so that when the carton arrives at station I all four side flaps are spread down out of the way so that the closure folds may be made. The leading flap 915 is tucked under the guides 984, 986 by a curved arm 988 fast on a vertical stud 990 mounted in a bracket 992. A connecting rod 994 pivotally attached to a second arm 996 fast on the stud 990 is connected at one end to the lever 938 and it will be seen that the curved arm 988 is operated through the same connections for pressing the bellows fold together. The bracket 992 is secured to a supporting plate 998 which is attached to a bracket 1000 mounted on the machine frame.

The carton having thus arrived at station I, the closure folding operations are now performed, see Figs. 38 to 41 inclusive. In order to produce the completed fold as shown in Fig. 22, three operations are required and as herein shown the liner comes to rest in front of a stationary anvil 1002. The first operation comprises a fold at right angles as shown in Fig. 20 and to this end a folding blade 1004 is provided which is carried by a swinging arm 1006. The arm 1006 is pivoted on a shaft 1008 mounted in the bracket 1000 and is operated through connections including a connecting rod 1010 pivotally attached to a second arm 1012 of the lever 1006, the other end being attached to one arm 1014 of a cam lever rockingly mounted on the rocker shaft 792. The other arm 1016 carries a cam roll 1018 which cooperates with a cam 1020 fast on the main cam shaft 758. A spring 1022 holds the roller 1018 against the surface of the cam 1020. The anvil 1002, over which the fold is made is adjustably supported on a bracket 1003 attached to the supporting plate 998.

The operating parts are now in a position illustrated in Fig. 39 and the second folding operation is now effected to produce the bag shown in Fig. 21. To this end a second folding arm 1024 is provided, to which is attached a folding blade 1026 at its lower end. The arm 1024, pivoted on the shaft 1008 is caused to rock to effect the fold through connections including a connecting rod 1028 pivotally attached to the second arm 1030 of the lever 1024, the other end being attached to one arm 1032 of a cam lever pivoted on the rocker shaft 792. The other arm 1036 carries a cam roll 1038 which engages the periphery of a cam 1040 fast on the cam shaft 758. A spring 1042 urges the cam roll 1038 against the surface of the cam 1040. It will be noted that the blade 1004 for effecting the first fold remains stationary and cooperates with the second folding blade 1026 during the second folding operation.

At this time both folding blades 1004, 1026 are rocked away from the liner in preparation for the third operation as shown in Fig. 41, and for producing the completely closed liner illustrated in Fig. 22. As herein shown, a rocking lever 1044 which carries a U shaped folding member 1046 is provided which is arranged to press the double fold already produced over the stationary anvil 1002. The lever 1044 is rocked from a cam 1048, fast on the cam shaft 758, the periphery of the cam working on a cam roller 1050 attached to a lever 1052. A connecting rod 1054 is pivotally attached to the end of a second arm 1056 of this lever and rocks the folding member 1046 through a connection to a second arm 1058 of the lever 1044. The lever 1044 is pivoted on a short shaft 1060 which is mounted in the bracket 1003. A spring 1061 urges the cam roll 1050 against the cam 1048.

Having thus effected the third and last fold for producing the liner closure, the carton is now advanced to station J where pressure is applied to firmly set the completed fold. During the passage of the liner from station I to station J the fold is guided and held in place by rollers 1062 rotatably mounted in a bracket 1064 secured to the supporting plate 896. As herein shown, see Figs. 32 and 42, the presser mechanism comprises a stationary member 1066 and a movable member 1068. The stationary member 1066 is formed on a bracket 1070 secured to the supporting plate 896. The movable member 1068 is formed on a swinging arm 1072 which is rocked through the toggle link 1074 connected to one arm 1076 of a two arm lever adjustably pivoted at 1078 in a bracket 1080 attached to the bracket 1070. A connecting rod 1084 pivotally attached to the second arm 1086 is connected to one arm 1088 of a cam lever pivoted on the rocker shaft 792. The second arm 1090 carries a cam roller 1092 which cooperates with a cam 1094 fast on the cam shaft 758. A spring 1096 is connected to the arm 1088, one end of said spring being attached to the machine frame and operating to keep the cam roller 1092 on the surface of the cam 1094. The arm 1072 is pivoted at 1098 in the bracket 1070 and operates to firmly set the folded closure of the liner through the connections described. The carton is now presented to station K where provision is made for closing the top and bottom end flaps of the carton, see Figs. 1 and 26. As herein illustrated two curved fingers 1100, 1102 are arranged to rotate in a clockwise direction and swing in behind the rear of the package to lay down the flap upon the top of the bag and up against the bottom of the bag. The rotating fingers 1100, 1102 are fast on the upper end of the vertical shaft 958 and are operated from the main cam shaft 758 through connections including a sprocket 1104 fast on the cam shaft 758 connected by a chain 1110 to a sprocket 1106 fast on a horizontal shaft 1108. The shaft 1108 is rotatably mounted in a bracket 1112 secured to the machine frame and a bevel gear 1114 fast on the other end of the shaft meshes with a bevel gear 1116 fast on the lower end of the vertical shaft 958. The vertical shaft is supported in bearing brackets 1118, 1120 secured to the machine frame. As the package advances from station K to station L the front end flaps, top and bottom come in contact with fixed curved rails 1122 which lay down the front end flaps and during this movement the rotating fingers 1100, 1102 cooperate to hold down the rear end flaps until both front and rear flaps have passed under the rails 1122. The rails 1122 secured to the machine frame also serve to spread the wide panel flaps, top and bottom into an outwardly extending horizontal position preparatory to receiving an application of adhesive at station M.

The carton is now in the condition illustrated in Fig. 24 and arrives at station M in this condition, where two glue rolls 1124, 1126, see Fig. 31, one for the top flaps and one for the bottom flaps simultaneously advance and travel over the flaps to apply a coating of glue thereto. A fixed central rail 1128 is provided to hold the narrow flaps, top and bottom in the closed position. The glue applying rolls 1124, 1126 are mounted in forked arms 1130, 1132, and are provided at their ends with rollers 1134, 1136 which cooperate with stationary tracks 1138, 1140 which guide the rolls 1124, 1126 over the flaps. A high spot 1142 is provided in the tracks for lifting the rolls as they reach the central position of the carton to prevent the central rails 1128 from having glue applied. The glue applying rolls 1124, 1126 receive their glue from the usual glue supply roll 1144 mounted to rotate in bearings in the machine frame and a cooperating roll 1146 establishes the proper film of glue on the roll.

The applying rolls 1124, 1126 are operated simultaneously from a rocker shaft 1148, the upper arm 1130 being connected through a linkage including a lever 1150, connecting rod 1152, lever 1154 fast on a shaft 1156 and a second lever 1158 also fast on the shaft 1156, the end of said lever being connected to the arm 1130. The lower arm 1132 is directly connected by a lever 1160 fast on the shaft 1148. The shaft 1148 is rocked through an adjustable and yieldable connection 1161 from a cam 1162 fast on the main cam shaft 758, see Figs. 26, 31. A roller 1164 cooperating with the cam 1162 is carried by a cam lever 1166 which is pivoted on the cross shaft 792 and a connecting rod 1168 pivotally connected to the end of the cam lever 1166 is connected to the yieldable connection 1161 on a slotted lever 1163 fast on the rocker shaft 1148. The glue supply roll 1144 and the cooperating roll 1146 are driven from the intermediate shaft 119 through cooperating bevel gears 1170, 1172, sprockets 1174, 1176 connected by a chain 1178 and cooperating spur gears 1180, 1182.

The carton is now presented first to station N and thence to station O where provision is made to eject the carton from the carton holding member 12 and projected between a series of top and bottom pressure rolls 1184. In its travel from station M to station O the side flaps of the carton, top and bottom are folded over, one upon the other to close and seal both ends of the carton and for this purpose, fixed guide rails 1186, 1188 are provided. The package is ejected from the holding member 12 by a finger 1190 which is secured to a sliding member 1192 arranged to slide on a horizontal bar 1194, secured to the machine frame, see Fig. 1. The sliding member 1192 is operated from a barrel cam 1196 fast on a cam shaft 1198 through connections including a cam roll 1200 attached to a cam lever 1202 and cooperating with the cam 1196, a second lever 1204 and a connecting link 1206 secured at one end to the sliding member 1192. The cam lever 1202 is pivoted on a vertical shaft 1208 mounted in the machine frame. The cam shaft 1198 is driven through sprockets 1210, 1212 connected by a chain 1214. The sprocket 1210 is fast on the shaft 60 driven as will be described. When the holding member 12 arrives at station O the gripping members 16, 18 are opened by the contact finger 34 as previously described and the ejecting finger 1190 which is positioned behind the carton is operated to project the carton between the pressure rolls 1184 where it is finally forced by succeeding packages into a dryer 1216 of the usual type from which it is delivered to be packed.

Reference is now made to Figs. 1, 27, 31, which illustrate the drive for the cam shafts 60 and 758 hereinbefore referred to and also the operation of the intermittently rotated conveyor. As herein shown, the main driving shaft 114 is provided with a pinion 1218 which drives a gear 1220 fast on the cam shaft 60 through an idler 1222 loosely mounted on a short shaft 1224 secured in the machine frame. The cam shaft 758 is provided with a gear 1226 which meshes directly with the pinion 1218.

As best shown in Fig. 31 the spider 10, which carries the carton holding members 12, is secured to the top of a vertical shaft 1227 which is mounted to rotate in bearings 1228, 1230, secured to the machine frame. The vertical shaft 1227 is intermittently rotated through a disc 1232 secured at the lower end of this shaft which is provided with a plurality of cam rollers 1234 corresponding to the number of carton holding members. These rolls are arranged to cooperate with a drum cam 1236 secured on the main cam shaft 758 and operate to rotate the vertical shaft 1227 one-sixteenth of a turn for each revolution of the cam shaft 758. A suitable dwell is provided in the cam path to permit the cartons to remain stationary for a sufficient length of time at each station to permit the various operations to be performed thereon.

While various features of the present invention have been illustrated and described as embodied in a complete machine for handling cartons, for forming and inserting a liner therein, for filling the lined cartons, for closing the mouth of the liner, and thereafter for closing and sealing the carton, it is to be understood that various features of the invention may be embodied with advantage in bag forming or bag closing machines and in other machines within the scope of the following claims.

Having thus described the invention, what is claimed is:—

1. In a machine of the character described, in combination, mechanism for folding a lining blank about a transverse axis and sealing together the contacting marginal edges of the sides of the blank to form projecting side seams of a liner, mechanism operative within the liner thus formed for creasing the bottom, side and end panels of the liner, mechanism for folding down the projecting side seams upon the side panels of the liner and forming projecting folded portions, and mechanism for folding the projecting folded portions of the bottom onto the liner thus formed.

2. The combination with bag forming means operative to form a bag having a rectangular shaped bottom and having side seams projecting from two opposite panels of the bag, of means for folding said side seams into a position substantially parallel to said panels.

3. In a packaging machine, in combination, carton supporting means, liner forming means operative to form a liner having a rectangular bottom and having side seams projecting from two opposite panels of the liner, means for folding said side seams into substantially parallel relation to said panels, and means for introducing the formed liners into cartons supported by said carton supporting means.

4. In a packaging machine, in combination, carton supporting means, bag forming mechanism, means for storing a supply of formed bags, mechanism for transferring bags as they are formed by the bag forming mechanism to said bag storing means and mechanism for introducing bags withdrawn from said supply into cartons supported by said carton supporting means to form liners therefor.

5. The combination with means for withdrawing a bag forming web from a roll supply thereof and means for severing the web transversely to form an individual bag forming sheet, of means for applying adhesive to marginal edges of one surface of said sheet, means for folding the sheet about an intermediate transverse axis and for pressing together the marginal portions of adjacent surfaces of the thus folded sheet whereby to form a bag, and means for thereafter opening the bag thus formed and for imparting thereto a rectangular shape.

6. The combination with means for withdrawing a bag forming web from a roll supply thereof and means for severing the web transversely to form an individual bag forming sheet, means for applying adhesive to marginal edges of one surface of said sheet, means for folding the sheet about an intermediate transverse axis and for pressing together the marginal portions of adjacent surfaces of the thus folded sheet whereby to form a bag, a bag supporting member, means for moving a bag into a position over the bag supporting member, means for operating the bag supporting member to open the bag and impart a rectangular shape thereto, and means for thereafter folding the projecting side seams of the bag against the adjacent surfaces of the bag while supported on the bag supporting member.

7. The combination with means for withdrawing a bag forming web from a roll supply thereof and means for severing the web transversely to form an individual bag forming sheet, of means for applying adhesive to marginal edges of one surface of said sheet, means for folding the sheet about an intermediate transverse axis and for pressing together the marginal portions of the sheet to form a bag, a magazine into which successive bags are delivered in a pile, an expansible bag supporting member, means for withdrawing the endmost bag from the pile and placing it over the bag supporting member, means for operating the bag supporting member to open the bag and impart a rectangular shape thereto, and means for thereafter folding down the projecting side seams against the body of the bag.

8. The combination with means for withdrawing a bag forming web from a roll supply thereof and means for severing the web transversely to form an individual bag forming sheet, of means for applying adhesive to marginal edges of one surface of said sheet, means for folding the sheet about an intermediate transverse axis and for pressing together the marginal portions of the sheet whereby to form a bag, a bag supporting member, a magazine into which successive bags are delivered in a pile, means for withdrawing the endmost bag from the pile and placing it over a bag supporting member, means for operating the bag supporting member to open the bag and impart a rectangular shape thereto, means for thereafter folding down the projecting side seams against the bag, and means for folding the projecting triangular extensions of the sides of the bag into a position adjacent the body thereof.

9. The combination with means for applying adhesive to marginal edges of one surface of a bag forming sheet, of means for folding the sheet about an intermediate transverse axis and for pressing together the marginal portions of adjacent surfaces of the thus folded sheet whereby to form a bag, and means for thereafter opening the bag thus formed and imparting thereto a rectangular shape.

10. The combination with means for applying adhesive to marginal edges of one surface of a bag forming sheet, of means for folding the sheet about an intermediate transverse axis and for pressing together the marginal portions of the sheet whereby to form a bag, a bag supporting member, means for moving a bag into a position over the bag supporting member, means for operating the bag supporting member to open the bag and impart a rectangular shape thereto, and means for folding the projecting side seams of the bag against the adjacent surfaces of the bag thus supported.

11. The combination with means for applying adhesive to marginal edges of one surface of a bag forming sheet, of means for folding the sheet about an intermediate transverse axis and for pressing together the marginal portions of the sheet whereby to form a bag, a bag supporting member, a magazine into which successive bags are delivered in a pile, means for withdrawing the endmost bag from the pile and placing it over a bag supporting member, means for operating the bag supporting member to open the bag and impart a rectangular shape thereto, and means for thereafter folding down the projecting side seams into a position against the body of the bag.

12. The combination with means for applying adhesive to marginal edges of one surface of a bag forming sheet, means for folding the sheet about an intermediate transverse axis and for pressing together the marginal portions of the sheet whereby to form a bag, a bag supporting member, a magazine into which successive bags are delivered in a pile, means for withdrawing the endmost bag from the pile and placing it over a bag supporting member, means for operating the bag supporting member to open the bag and impart a rectangular shape thereto, means for thereafter folding down the projecting side seams against the adjacent surfaces of the bag, and means for folding the projecting triangular shaped extensions of the sides against the body of the bag.

13. The combination with a bag supporting member for supporting a rectangular shaped bag with side means projecting from opposite side panels of the bag and with projecting triangular shaped extensions of the said side panels of the bag, of side seam folding mechanism operative to fold said projecting side seams adjacent said side panels, and means operative thereafter for folding said triangular shaped extensions of said side panels against the body of the bag.

14. The combination with a bag supporting member for supporting a rectangular shaped bag with side seams projecting from opposite side panels of the bag and with projecting triangular shaped extensions of the said side panels, of side seam folding mechanism operative to fold said projecting side seams adjacent said side panels, and means operative thereafter for folding said triangular shaped extensions against the said side panels of the bag.

15. The combination of a bag supporting member adapted to support a rectangular shaped bag in position with side seams projecting from opposite side panels of the bag and with triangular shaped extensions of the side panels, of means for folding side seams against the said side panels of the bag.

16. In a machine of the character described, in combination, a rotatable bag supporting member provided with a plurality of individual bag supports for supporting bags having projecting side seams, of means disposed at one station in the path of rotation of said bag supporting member for folding down said projecting side seams.

17. In a carton closing machine, in combination, carton supporting means, adhesive applying means comprising an adhesive applying member movable across flaps of the carton to which it is desired to apply the adhesive, and means for controlling the path of movement of the adhesive applying member whereby to effect the application of the adhesive during a portion only of the movement of the adhesive applying member.

18. In a carton closing machine, in combination, means for operatively supporting a carton having top and bottom flaps, a pair of adhesive applying members, means for moving the adhesive applying members to simultaneously apply adhesive to the top and bottom flaps of the carton, and means for controlling the path of movement of said adhesive applying members whereby to permit the application of adhesive during a portion only of the movement of the adhesive applying members.

19. In a carton closing machine, in combination, means for supporting a carton having a set of flaps ready to be closed, means for folding down the narrower set of flaps, means for moving an adhesive applying member across said folded down flaps, and means for altering the path of movement of said adhesive applying member between said flaps whereby to permit the application of adhesive only during the movement of the adhesive applying member in contact with said flaps.

20. In a machine of the character described, the combination of a spider, a plurality of generally radially extending collapsible liner supporting members carried by said spider, means for intermittently rotating said spider to successively move said liner supporting members to different stations, means for collapsing said liner supporting members at one of said stations, means for placing a liner on said supporting members while in collapsed condition, means for thereafter expanding the liner supporting members to shape the liner, means for collapsing said liner supporting members while at another of said stations, and means at said last-mentioned station for stripping the shaped liner from the collapsible liner supporting member.

ARTHUR W. LINDHOLM.
GUSTAF WALDEMAR ANDERSON.